United States Patent
Chadli

(10) Patent No.: US 7,937,463 B2
(45) Date of Patent: May 3, 2011

(54) METHOD AND SERVER FOR INVOKING APPLICATION SERVERS IN A SIP NETWORK

(75) Inventor: Youssef Chadli, Bagneux (FR)

(73) Assignee: France Telecom, Paris (FR)

( * ) Notice: Subject to any disclaimer, the term of this patent is extended or adjusted under 35 U.S.C. 154(b) by 407 days.

(21) Appl. No.: 12/083,462

(22) PCT Filed: Oct. 10, 2006

(86) PCT No.: PCT/FR2006/002272
§ 371 (c)(1),
(2), (4) Date: Apr. 11, 2008

(87) PCT Pub. No.: WO2007/042661
PCT Pub. Date: Apr. 19, 2007

(65) Prior Publication Data
US 2009/0164591 A1    Jun. 25, 2009

(30) Foreign Application Priority Data
Oct. 14, 2005  (FR) .................................. 05 10517

(51) Int. Cl.
*G06F 17/00* (2006.01)
*H04B 7/00* (2006.01)
(52) U.S. Cl. ...................... 709/224; 709/228; 455/519
(58) Field of Classification Search .................. 709/206, 709/224, 228; 707/2; 455/519
See application file for complete search history.

(56) References Cited

U.S. PATENT DOCUMENTS

| | | | |
|---|---|---|---|
| 7,228,145 B2 * | 6/2007 | Burritt et al. ................... | 455/519 |
| 7,366,759 B2 * | 4/2008 | Trevithick et al. ............. | 709/206 |
| 7,581,100 B2 * | 8/2009 | Mizrah ......................... | 713/171 |
| 2005/0050194 A1 | 3/2005 | Honeisen et al. | |
| 2005/0190772 A1 | 9/2005 | Tsai et al. | |
| 2006/0146798 A1 * | 7/2006 | Harton et al. .................. | 370/352 |
| 2007/0121596 A1 * | 5/2007 | Kurapati et al. .............. | 370/356 |
| 2007/0149166 A1 * | 6/2007 | Turcotte et al. ............. | 455/404.1 |
| 2009/0290574 A1 * | 11/2009 | Bottiero ....................... | 370/352 |

OTHER PUBLICATIONS

"3rd Generation Partner Project; Technical Specification Group Core Network; IP Multimedia (IM) Session Handling; IM Call Model; Stage 2 (Release 5); 3GPP TS 23.218" ETSI Standards, European Telecommunications Standards Institute, Sophia-Antipo, FR, No. V560, Sep. 2003. XP014021930.

* cited by examiner

*Primary Examiner* — Khanh Q Dinh
(74) *Attorney, Agent, or Firm* — McKenna Long & Aldridge LLP

(57) ABSTRACT

The invention concerns a method for invoking at least one service application server (AS) during a communication between an originating user agent (O_UA) and end user agent (T_UA). It consists at least in opening (A) two separate dialogues, between a service selecting function (SIF) and, respectively, the originating agent (O_UA) and the end agent (T_UA). The function (SIF) is substituted to the user agent (T_UA) in its dialogue with the user agent (O_UA) and to the user agent (O_UA) in its dialogue with the user agent (T_UA). The messages from the user agents during the two opened dialogues are stored (B) and at least one service conditional triggering criterion on the two dialogues is verified (C). If the triggering criterion is verified, at least part of the messages is restored (D) to the server so as to trigger the invocation thereof. The invention is useful for invoking application servers in a SIP network.

16 Claims, 13 Drawing Sheets

METHOD AND SERVER FOR INVOKING APPLICATION SERVERS IN A SIP NETWORK

This application claims the benefit of PCT Patent Application No. PCT/FR2006/002272, filed Oct. 10, 2006, which claims the benefit of French Patent Application No. 05 10517, filed Oct. 14, 2005, which are both hereby incorporated by reference in their entirety.

The invention relates to a method and a server for invoking, in the context of a call, service logics in an SIP (Session Initiation Protocol) environment, or any other environment, when executing a dialog or an SIP transaction, between two user agents of a network, such as the IP network.

As a general rule, it will be recalled that a user agent is a software entity, associated with the OSI (Open System Interconnection) reference model, representing a user and which handles the interface, transfer and storage functions for messages that originate from or are addressed to this user.

Consequently, an SIP dialog is a message interchange between two user agents, an interchange that takes time. An SIP dialog contains a set of SIP transactions. At each end of the interchange, the latter is, among other things, identified by three parameters:

"Local tag": created by this end itself, corresponding to the "Remote tag" for the other end;
"Remote tag": sent by the other end;
"Call-Id": created by the end having initiated this dialog.

The original SIP RFC recommendation, RFC 3261, provides only for the INVITE method to set up a dialog between two user agents. Following new extensions, a dialog can be set up via other messages such as REFER, defined by the RFC 3515 recommendation or SUBSCRIBE, defined by the RFC 3565 recommendation.

By convention, an SIP dialog is said to be incoming for a UA entity which is the terminal user agent of this dialog T_UA and an SIP dialog is said to be outgoing for a UA entity which is the origin user agent O_UA of this dialog.

An SIP transaction is a request/answer interchange between two user agents. A client user agent transmits a request to a server user agent, which responds with a set of answers. This set contains, as appropriate, provisional answers and, always, a final answer, terminating the transaction.

For a transaction or an SIP dialog, the origin user agent O_UA is the SIP agent that generated the request initiating this dialog or this SIP transaction. The abovementioned agent can be an SIP terminal or an SIP server working in cut-off mode, and behaving in B2BUA (Back To Back User Agent) operating mode.

For a transaction or an SIP dialog, the terminal user agent T_UA is the agent that has received the request initiating this dialog or this transaction, and that has answered thereto. This agent can also be an SIP terminal or an SIP server in B2BUA operating mode.

A session presents one or more media streams (data of various kinds) between a number of participants.

The characteristics of a session are negotiated by SDP interchanges, of the offer/answer type, as defined in the IETF recommendation RFC 3264. At the present time, the abovementioned INVITE method can be used to set up a session, and also a dialog, a session corresponding to at least one dialog.

A user agent working in B2BUA mode, as represented in FIG. 1a, works in an operating mode consisting in placing back to back a front UA user and a back UA user, two different dialogs or transactions, but relating to one and the same interchange, session or transaction. This operating mode enables the entity that implements it to monitor all the aspects of the call or of the communication.

On receiving an incoming request coming from the O_UA, A and intended for the T_UA, B, as represented in FIG. 1a, this entity acts as if it was the terminal or destination terminal user agent T_UA, B. It therefore receives all the other messages from the O_UA, A, intended for B relating to the transaction or the dialog initiated by this request. Then, it generates another request that it sends towards the real destination, working as if it was the terminal having sent the first request. It also receives all the other messages from the destination terminal T_UA, B, intended for the origin terminal O_UA, A, relating to the transaction or to the dialog initiated by this request. The entity working in B2BUA mode thus remains cut off from all the SIP signaling messages exchanged between the O_UA, A, and the T_UA, B, concerning the dialog or the transaction initiated by A.

It will also be recalled that an SIP proxy server is a relay server for routing the SIP messages. This type of server has only one role in signaling, but does not manage media. It is not generally the origin of any request, except a CANCEL request for releasing a session.

Finally, an SIP application server is a server hosting one or more service logics. The notion of service here covers any mechanism for transporting information for the layers of the OSI model. The application server provides a runtime environment for the service logic. A service logic is therefore a software application intended to provide a given service, by acting on the SIP signaling.

At the present time, only the 3GPP (Third Generation Partnership Project Agreement) group has, within the context of IMS (IP Multimedia System) defined a mechanism enabling an SIP proxy, designated S-CSCF, to call one or more service logics at the start of a dialog or an SIP transaction, so as to be able to develop service logics on servers separate from the call server. This approach thus uses one of the objectives of the intelligent network.

Referring to FIG. 1b, according to the above-mentioned mechanism, a service logic SL is hosted in an application server AS which provides the latter with a runtime environment.

The abovementioned mechanism relies on an SIP interface based on the SIP protocol between the SIP proxy, S-CSCF, and with the application server AS, to continue or terminate the session.

The proxy S-CSCF hosts the IFC (Initial Filter Criteria) enabling it to know if an initial request has to be sent to a given AS or not. An IFC contains, among other things:

The URI (Universal Resource Identifier) address of the AS concerned with the IFC
Condition criterion, TP (Trigger Point): determines the criterion or criteria that the SIP request must satisfy for it to be transferred to the application server AS specified in the IFC. These criteria apply neither to the requests belonging to an SIP dialog already set up nor to the responses. They apply only to the requests initiating a dialog (INVITE, SUBSCRIBE, etc.) or to the requests that do not set up any dialog (OPTIONS, REGISTER, MESSAGE, etc).

The condition criteria TP can relate to the name of the method, the presence or absence or content of any header, known or otherwise, content of the URI-request, direction of the request, originating from or addressed to a registered user, request intended for a non registered user, information contained in the SDP (Session Description Protocol) body.

The service profile is downloaded by the proxy S-CSCF when the user registers.

The procedure for the invocation of an application server AS by the proxy S-CSCF is then as follows: when an initial request reaches the proxy S-CSCF, the latter first checks that the user is not barred. In the absence of barring, the procedure continues to the application server AS, thanks to the use of iFC filtering criteria by the S-CSCF, which can decide whether one or more application servers must be invoked, following the receipt of an initial SIP request.

Invoking an application server AS simply entails transmitting this request to the latter.

The iFC filtering criteria are stored in the server managing the HSS (Home Subscriber Server) user profiles and are defined for each user. The corresponding filters are used statically and downloaded by the proxy S-CSCF when the user registers, on connecting to the network.

The server managing the HSS user profiles associates, for each public identity of a user terminal, a service profile. This profile can contain one or more descriptions of filtering criteria designated iFC (Initial Filter Criteria).

The current filtering criteria iFC contain the following main parameters, data or data structures:
priority PR: priority of the filtering criteria iFC in relation to other filtering criteria;
parameters of the application server AS:
  server name SN: specifies the URI (Uniform Resource Identification), designating the application server AS which must be invoked when the filtering condition is satisfied;
  defect handling DH: specifies the processing to which the request must be subjected by the proxy S-CSCF, continue or stop the corresponding session, in the case where the latter cannot set up the connection as follows: if it is a registration request REGISTER, the proxy S-CSCF checks all the iFC criteria and sends an agreement message Third-Party REGISTER, according to technical specification TS 29228, to each application server AS for which the filtering conditions have been satisfied.

For all the separate initial requests of the method corresponding to the REGISTER request, the proxy S-CSCF proceeds as follows:
1) Installation of the list of iFC criteria for this request according to their priority. The order of the iFC criteria is unchanged until the request finally leaves the proxy S-CSCF, which points to the first iFC criterion on the list;
2) Verification that the request satisfies the criteria of the iFC pointed to.
  a) If it does, the proxy S-CSCF:
    i) Adds a field "P-Original-Dialog" which will enable it to recognize the request returned by the application server AS, even if its dialog identifier has been changed by the latter;
    ii) Adds the URI of the application server AS specified by the iFC criterion at the head of the Route field, followed by its own URI, then sends the request to this application server AS. The latter executes the service logic, can modify the request and send it again to the proxy S-CSCF. The request sent to the proxy S-CSCF must have the same dialog reference "P-Original-Dialog".
    iii) On once again receiving the request from the application server AS, the proxy S-CSCF goes on to the next step 3.
  b) If not, the proxy S-CSCF goes on to the next step 3.
3) If the iFC criterion pointed to is not the last in the list, the proxy S-CSCF moves the pointer to the next iFC criterion and goes back to step 2. Otherwise, it goes on to the next step 4.
4) Routing of the request according to a normal SIP routing, according to the RFC 3261 recommendation.

The procedure described hereinabove is that given by the 3GPP specification. The pointer is used only to facilitate the explanation, but its implementation in the S-CSCF is not essential.

If an application server AS decides to locally terminate a request and forwards a final answer for this request, via the ISC interface (IP multimedia Subsystem Service Control Interface) to the proxy S-CSCF, the latter aborts the verification of the other remaining iFC criteria. This answer includes the field "P-Original-Dialog" that the proxy S-CSCF had introduced into the request in the step 3a)i), in order for the latter to be able to correlate the two messages.

Following the reception of a request from the proxy S-CSCF, the application server AS can behave in the following three ways, depending on the service logic executed, with reference to FIGS. 1c, 1d and 1e, in which C_ID designates a dialog or SIP transaction identifier.

As terminal user agent T_UA or redirection server, FIG. 1c: in this operating mode, the application server AS acts as a terminal user agent terminating the SIP transaction or as a redirection server for the SIP#1 dialog.

As SIP proxy, FIG. 1d: in this case, the SIP request is transferred by the proxy S-CSCF to the application server AS. The latter can modify certain headers contained in this request, in accordance with the rules defined by the IETF (Internet Engineering Task Force) in recommendation RFC 3261, then return the latter to the proxy S-CSCF which transfers it to the next node, the dialog SIP#1 being transmitted without changing its dialog identifier.

As B2BUA user agent, FIG. 1e: in this operating mode, the application server AS terminates the SIP request transferred by the proxy S-CSCF, acts as a terminal user agent T_UA, and generates a new request, by acting as origin user agent O_UA, initiating a different SIP dialog #2, which it sends to the proxy S-CSCF.

The abovementioned prior art gives satisfaction, but it presents the following drawbacks, which will be given purely as an example with respect to services relating to conversational applications but generally relates to all the multimedia application service types that use the SIP protocol.
1) Services can be triggered only on the first request initiating the session or the transaction. Thus, an application server AS needing a trigger on a response to the initial request or on a request that can be sent in the dialog initiated by this request must be invoked on reception of this request. The following examples illustrate this problem in the following situations:

Invocation of the Call Forwarding on No Reply Service

This service should be triggered on reception of a "180 Ringing" SIP response to the INVITE request, not followed by the acceptance response "200 OK" or a release of the call within a defined time. By using the invocation mechanism of the above-mentioned prior art, the application server managing this service must be invoked on arrival of the first INVITE request initiating the call. Because of the low percentage of the calls forwarded on no reply, the abovementioned application server AS will be invoked, in most cases, without there being any need to trigger the service. This causes the call setup delay to be prolonged and unnecessarily overloads the application server AS.

An identical problem arises for invocation of the following services:

CRBT (Colored RingBack Tone):

This service requires triggering on reception of the response "180 Ringing" to the INVITE request initiating the call.

Call Waiting Indication, IAI:

This service can be triggered on reception of an SIP request to the initial INVITE request indicating that the call has been presented to wait. This indication can be contained either in a header like the "Alert-Info" header, or in the SDP (Session Description Protocol) description.

Action on No Reply:

This service can be triggered on the same triggering criterion as that of the "forwarding on no reply" service.

Call Transfer:

This service can be triggered on reception of the REFER request within an existing dialog.

Call Hold:

This service can be triggered on reception of a re-INVITE request within an existing dialog, containing an SDP offer indicating that the remote terminal must be placed on hold.

Call Forwarding on Busy:

This service can be triggered on receipt of the response "486 Busy Here" or of the response "600 Busy Everywhere" to the initial INVITE request.

Most of the services require triggering on a message that is different from the initial request requiring the application server AS to behave in B2BUA mode. Such is in particular the case with the abovementioned services.

2) The current triggering criteria do not take account of the state of the called terminal (free, busy to the nth degree, alerted, etc.). Thus, it is not possible to invoke an application server AS, following the reception of an INVITE request intended for a user terminal that is busy to the first degree. This is why implementing the double call service on an application server AS entails introducing the latter immediately after the start of any call addressed to the user concerned. Given the low percentage of "Double Call" situations, the application server AS will be invoked, in most cases, without it being necessary to trigger the service. This prolongs the call setup delay and unnecessarily overloads the above-mentioned application server AS.

3) All the services that require the application server AS to behave in B2BUA mode or in "Proxy dialog stateful" mode, also require the application server AS to retain this behavior until the end of the call. For all the services mentioned previously, affected by the abovementioned mode, the application servers AS must be involved in all the calls intended for the subscribers concerned, from the start to the end of the call. Consequently, in most cases, the application servers AS providing these services will be involved from the start to the end of the call, without the service being triggered.

The object of the present invention is to overcome the drawbacks of the prior art as described previously, inherent to the triggering mechanism, not only in the field of conversational applications but also in any multimedia application domain.

In particular, one object of the present invention is to implement a method and a system for invoking an application server only when the service logic hosted by the latter must be triggered. As an example, the application server AS providing the "Call transfer" service in the context of call management in IP telephony, mobile or fixed for example, will be invoked only when the user invokes this service, that is, when the proxy S-CSCF receives the REFER request in the relevant call SIP dialog.

Another object of the present invention is to implement a method and a system of invoking an application server AS enabling any invoked application server to leave the call at any time, unlike the technique of the prior art.

Another object of the present invention is to implement a method and a system of invoking an application server working on triggering criteria that take account of the state of the called terminal.

Another object of the present invention is consequently to implement a method and a system of invoking an application server whereby, with any application server being invoked only when the service must actually be rendered, on the one hand, but being able to leave the dialog when the service logic is executed on the other hand, the call setup delay is reduced and each application server consequently has a lesser load, which makes it possible to increase the effective handling capacity of the latter.

The method of invoking at least one service application server, in a communication between an origin user agent and a terminal user agent, the subject of the invention, is noteworthy in that it comprises at least the steps consisting in opening two separate dialogs, these dialogs comprising messages, between a selective service invocation function and, respectively, the origin user agent and the terminal user agent, the selective service invocation function replacing the terminal user agent in its dialog with the origin user agent and replacing the origin user agent in its dialog with the terminal user agent, storing the messages originating from the user agents in both open dialogs, checking at least one conditional service triggering criterion on the two dialogs and, if the triggering criterion is satisfied, at least partly restoring the stored messages to the service application server, in order to trigger the invoking of the latter.

The method that is the subject of the invention is also noteworthy in that the selective service invocation function also comprises the interpretation of an SIP stop message sent by any application server asking to be withdrawn from a call.

The method that is the subject of the invention is also noteworthy in that the conditional service trigger criterion or criteria includes/include the reception of a response to an initial request, the expiry of a time delay, measuring the duration between the reception of a provisional response and the non-reception of a definitive response, the reception of a request received in a confirmed dialog, the reception of a request received in an unconfirmed dialog and the state of the terminal user agent.

It will be better understood from reading the description and studying the drawings below in which, FIG. 1a represents, by way of illustration, a user agent working in a B2BUA mode according to the prior art;

FIG. 4c represents, by way of illustration, the application of the method that is the subject of the invention to an SIP response to the initial SIP request invoking two service application servers AS;

Figure 5A:
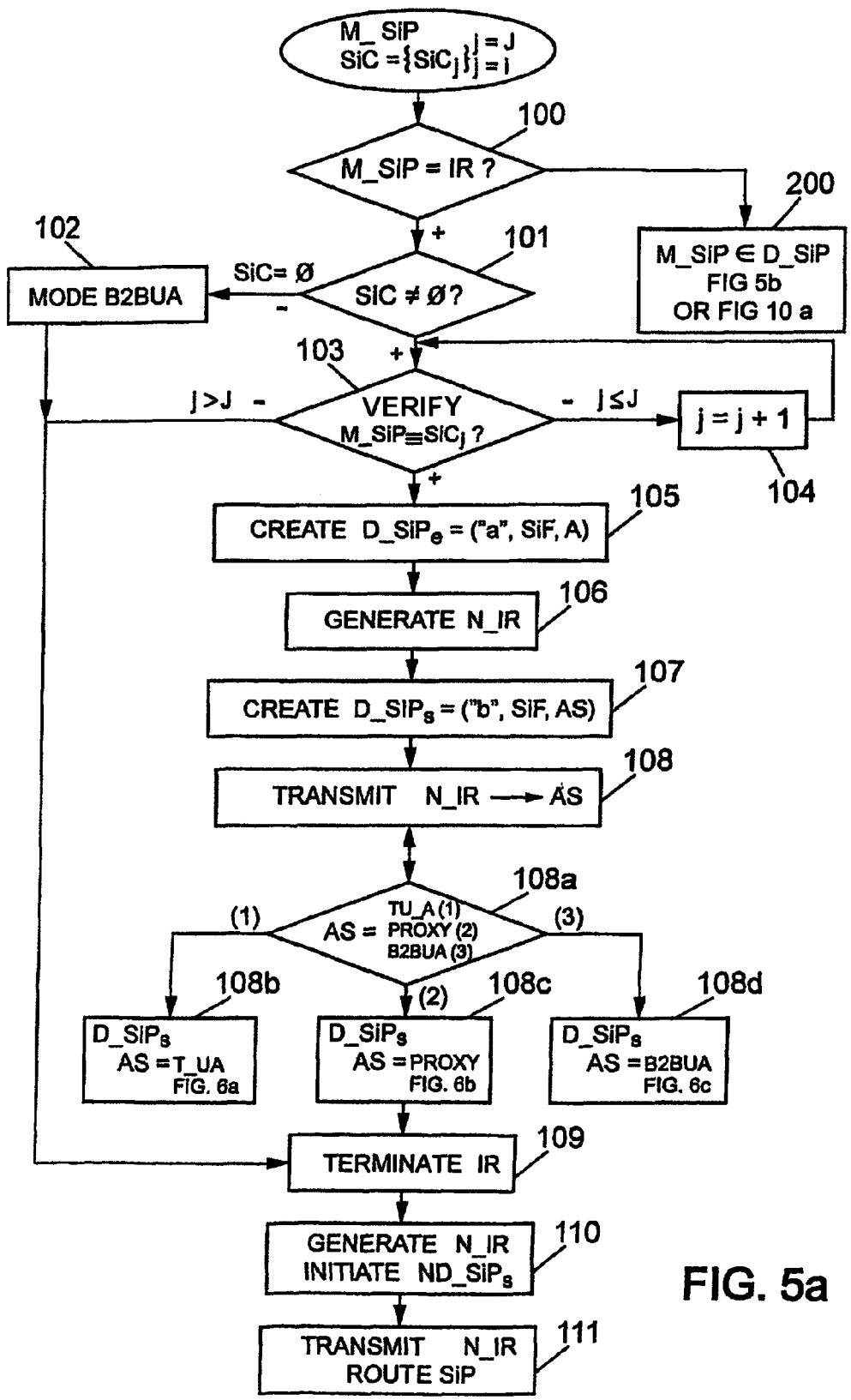
Figure 5B:
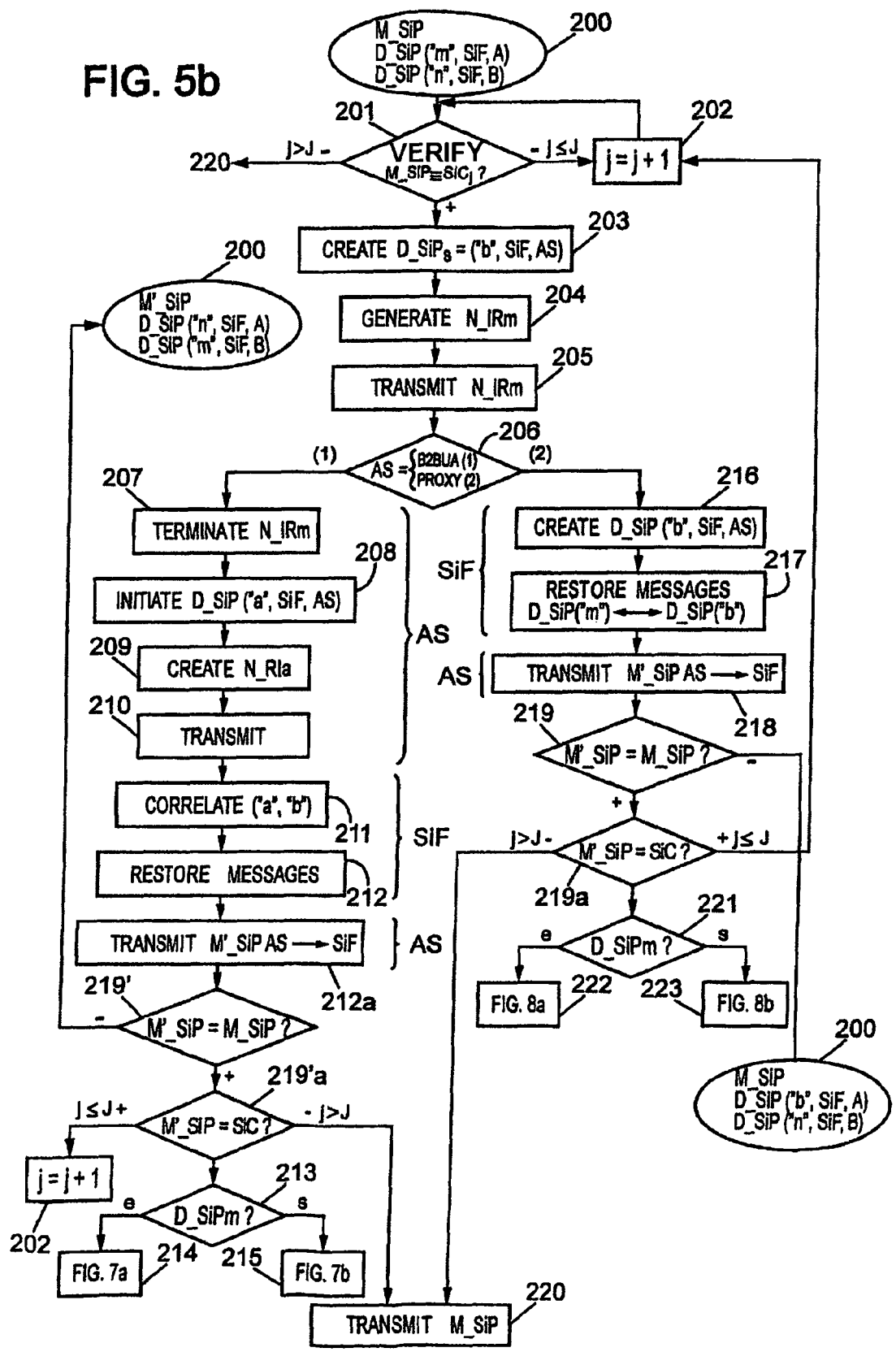
Figure 6A:
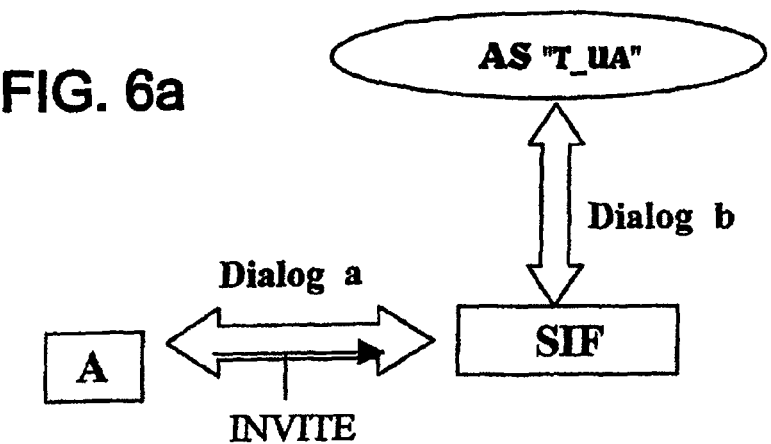
Figure 6B:
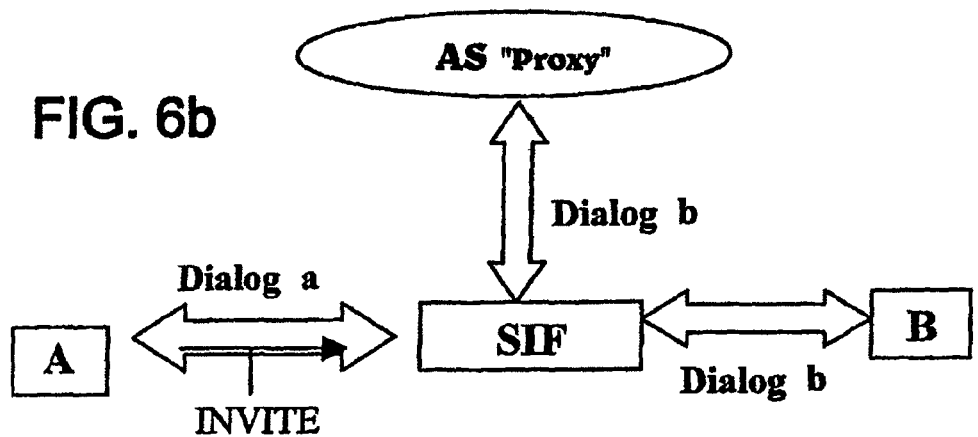
Figure 6C:
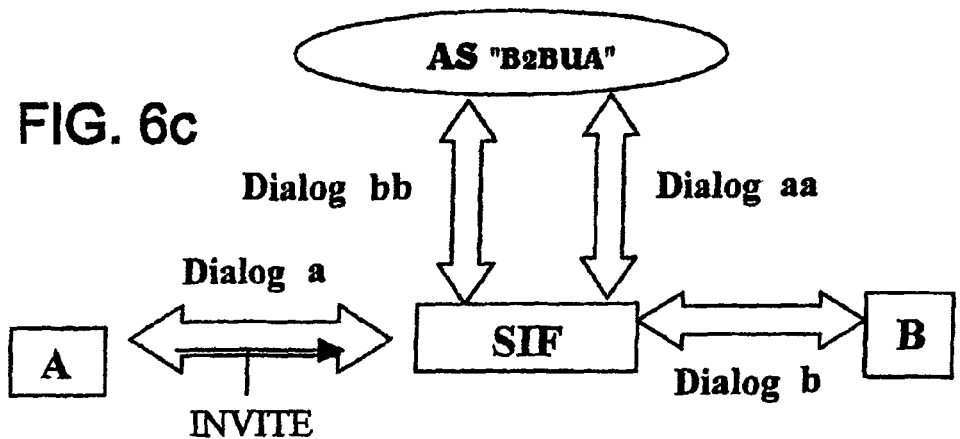
Figure 7A:
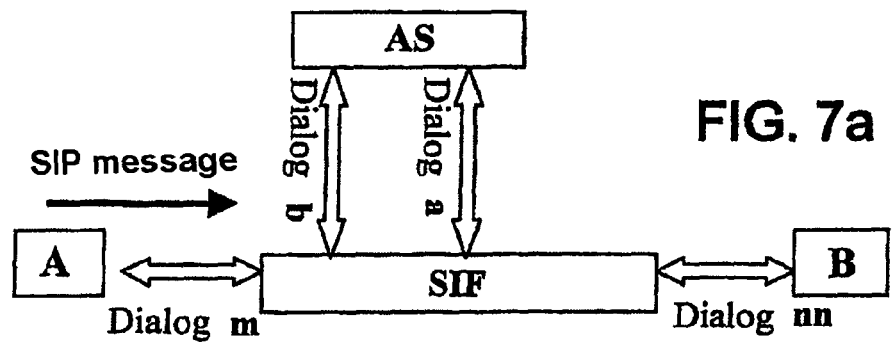
Figure 7B:
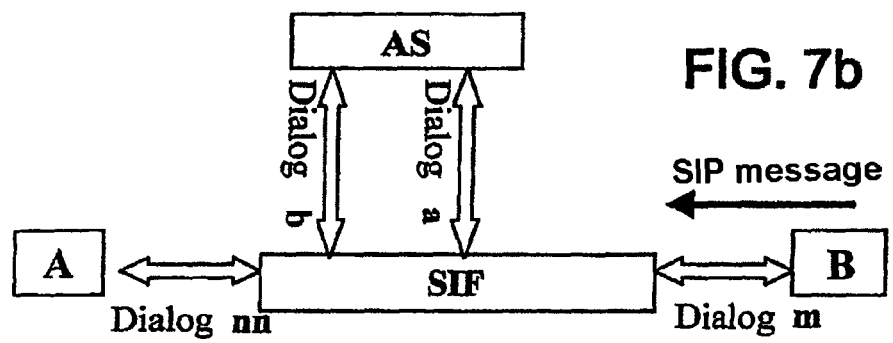
Figure 8A:
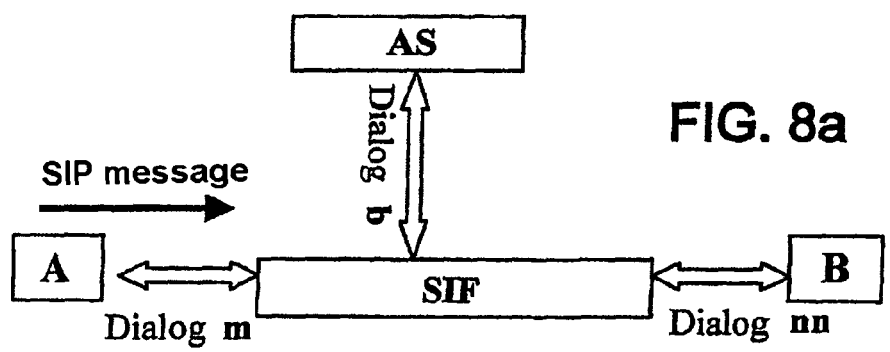
Figure 8B:
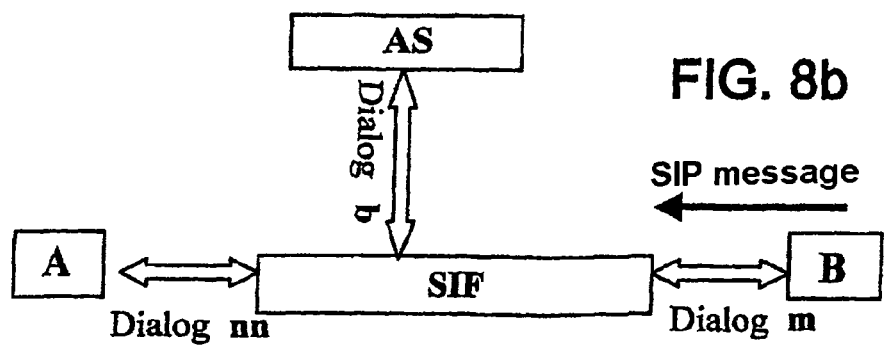
Figure 9:
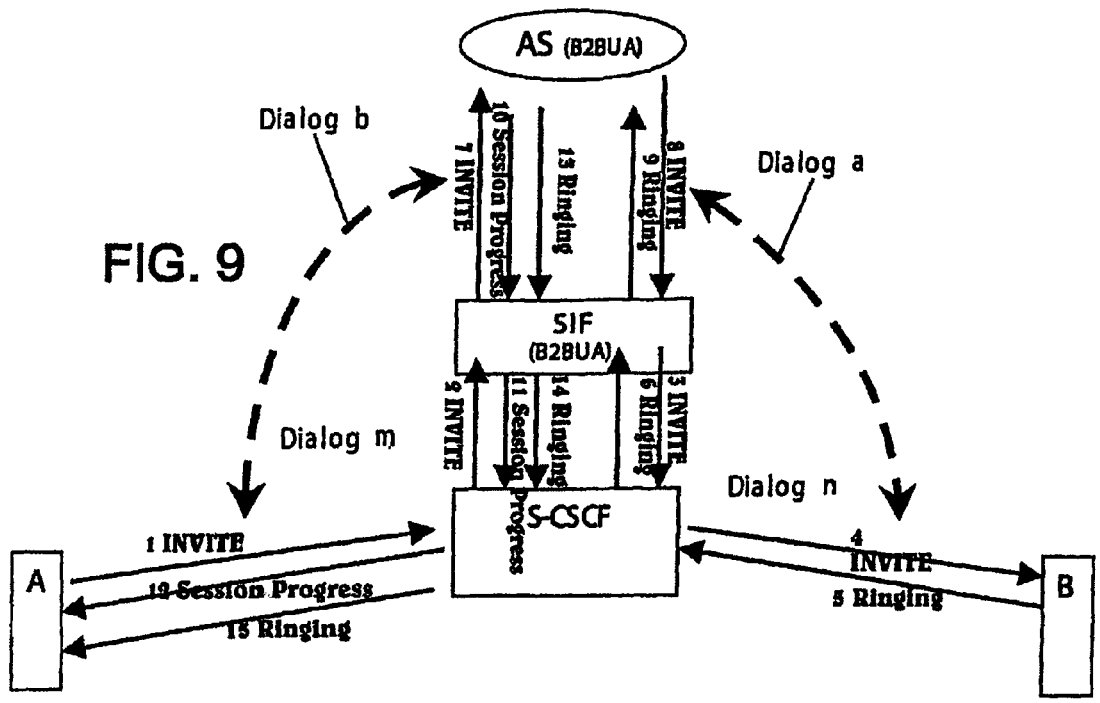
Figure 13:
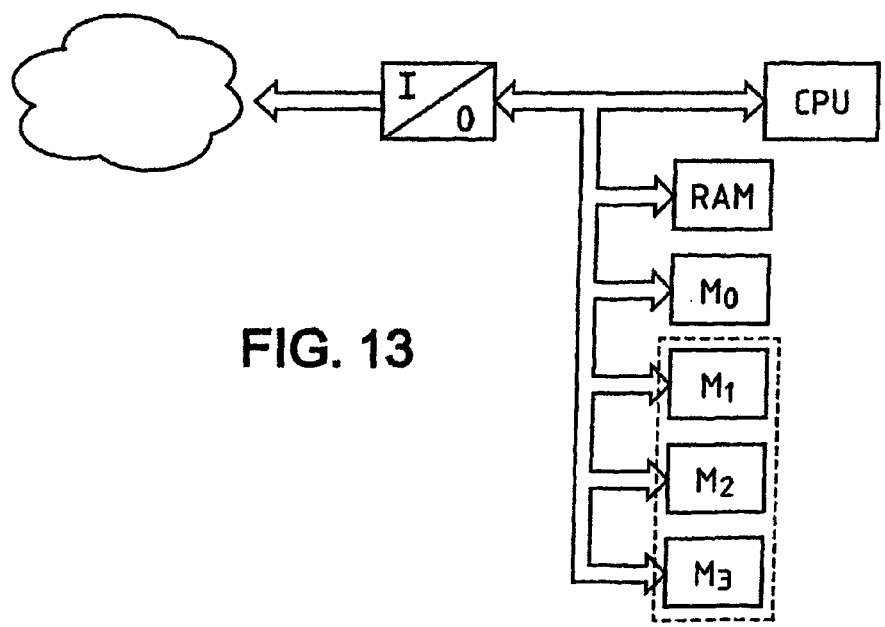
Figure 10A:
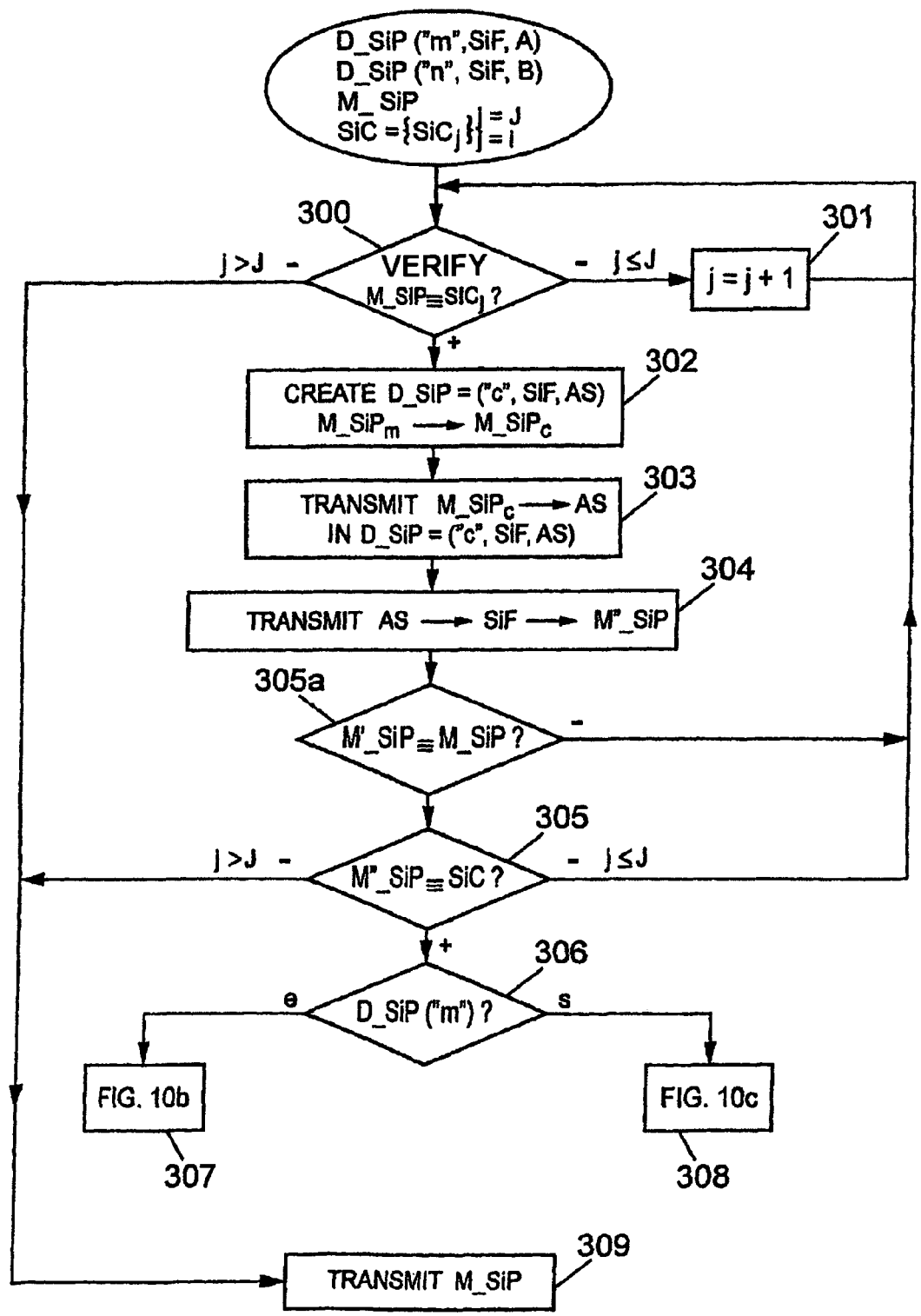
Figure 10B:
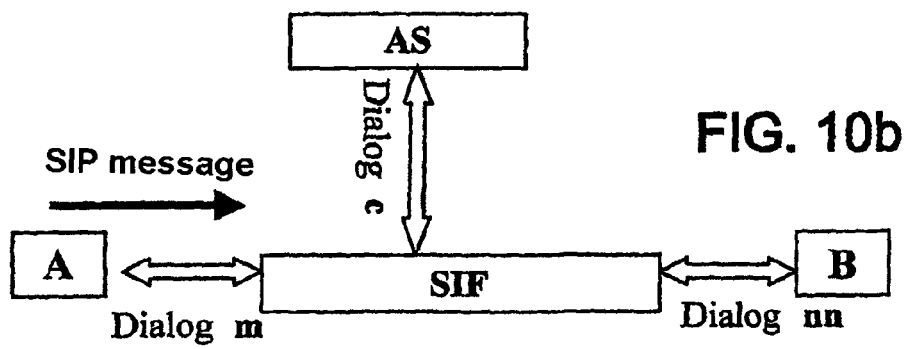
Figure 10C:
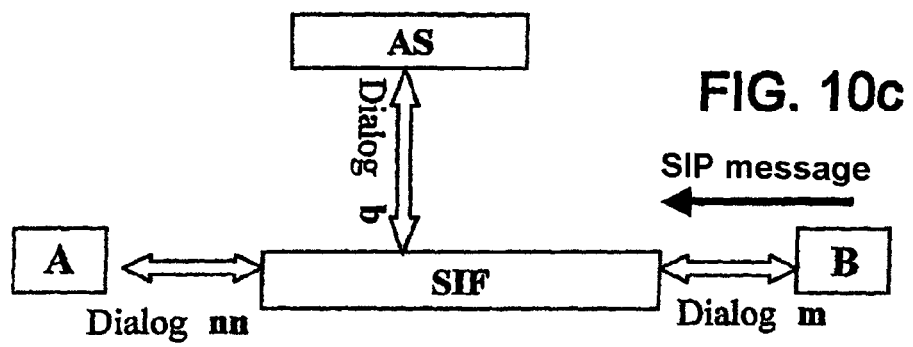
Figure 11:
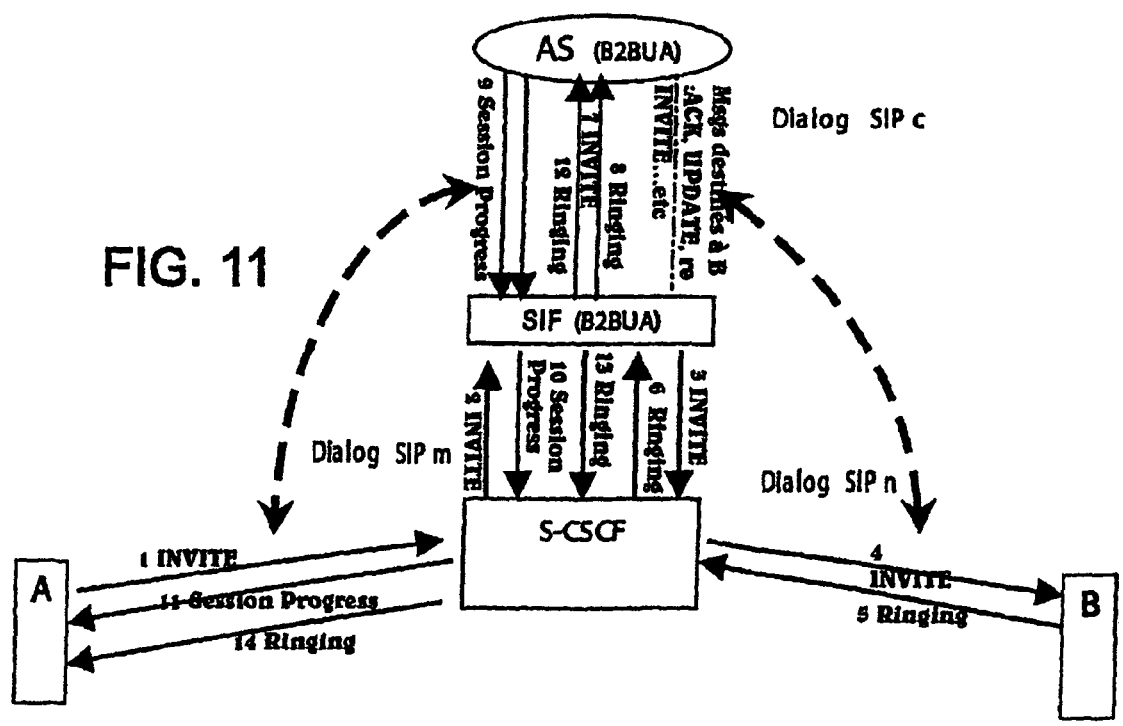
Figure 12A:
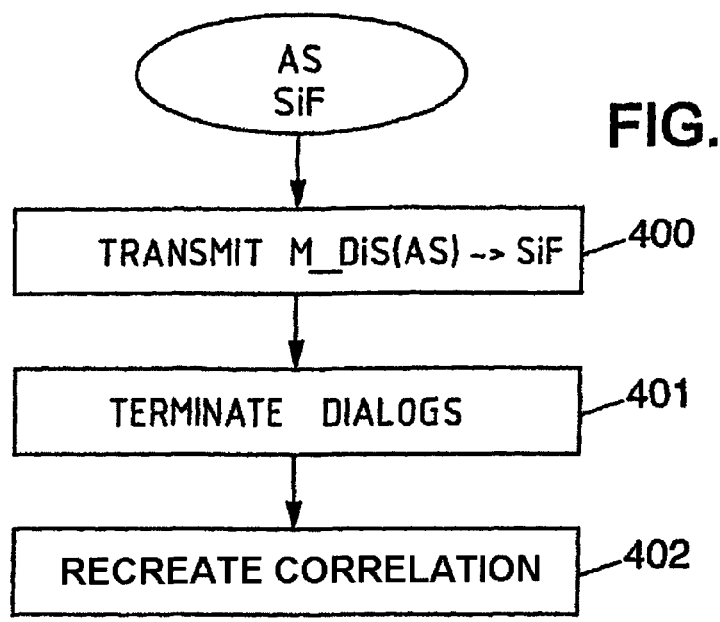
Figure 12B:
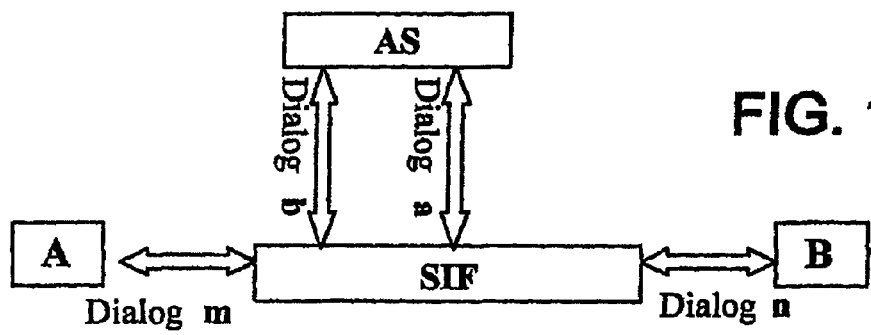
Figure 12C:
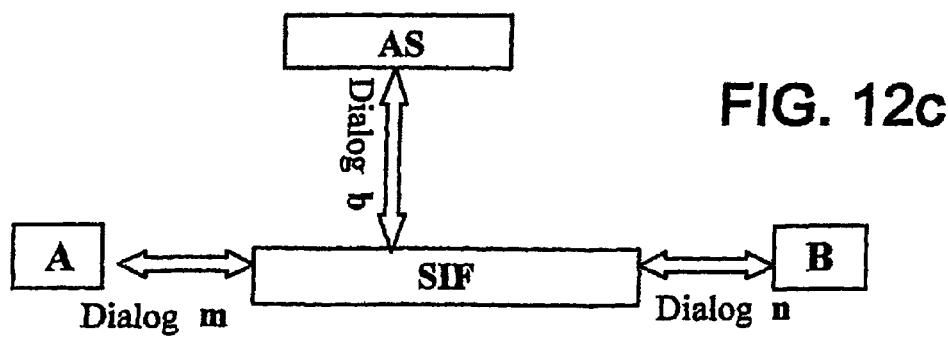

FIG. 5a represents, by way of illustration, a flow diagram of the steps implemented by the method that is the subject of the invention, via the selective service invocation function, working in transparent mode with respect to the 3GPP mode, in the specific case where the SIP message received by the latter does not belong to an existing SIP dialog, this SIP message corresponding either to an initial request initiating an SIP dialog or to an initial request not initiating an SIP dialog;

FIG. 5b represents, by way of illustration, a flow diagram of the steps implemented by the method that is the subject of the invention via the selective service invocation function, working in transparent mode with respect to the 3GPP mode, in the specific case, complementing FIG. 5a, where the SIP message received by this function belongs to an existing SIP dialog;

FIGS. 6a, 6b and 6c represent, in detail, an SIP message interchange process between the selective service invocation function and the application server, when the latter is working either in terminal user agent mode, or in proxy mode, or even in B2BUA mode, and the SIP message received initiates an SIP dialog, according to FIG. 5a;

FIGS. 7a and 7b represent, in detail, the SIP message interchange process between the selective service invocation function and the application server and action executed by the latter, when the SIP message belongs to an existing SIP dialog according to FIG. 5b and the application server is working in B2BUA mode;

FIGS. 8a and 8b represent, in detail, the SIP message interchange process between the selective service invocation function and the application server and actions executed by the latter, when the SIP message belongs to an existing SIP dialog according to FIG. 5b and the application server is working in proxy mode;

FIG. 9 represents, by way of illustration, an exemplary execution of the method that is the subject of the invention in the form of a space-time diagram, for a service provided by a service application server being triggered on reception by the selective service invocation function of a "180 Ringing" response to an SIP protocol INVITE request, when this selective service invocation function is working in transparent mode according to FIGS. 5a and 5b;

FIG. 10a represents, by way of illustration, a flow diagram of the steps implemented by the method that is the subject of the invention, via the selective service invocation function working in a simplified non-transparent mode with respect to the 3GPP mode, in which the number of SIP messages exchanged is reduced;

FIGS. 10b and 10c represent, by way of illustration and in detail, the SIP message interchange process between the selective service invocation function and the application server, when the dialog transmitting the inciting SIP message is an incoming dialog, respectively an outgoing dialog;

FIG. 11 represents, by way of illustration, an exemplary execution of the method that is the subject of the invention, in the form of a space-time diagram, for a service provided by a service application server being triggered on reception by the selective service invocation function of a "180 Ringing" response to an SIP protocol INVITE request, when this selective service invocation function is working in non-transparent mode;

FIGS. 12a, 12b and 12c represent, by way of illustration, a preferred process for disengaging an application server evoked prior to the end of a call from a user agent, in accordance with the method that is the subject of the invention;

FIG. 13 represents, by way of illustration, an application server invocation server according to the subject of the present invention.

A more detailed description of the method of invoking a service application server by an SIP call server, according to the subject of the present invention, will now be given in association with FIG. 2a and the subsequent figures.

The method that is the subject of the invention is implemented in an SIP environment and, in particular, the environment of a call server S-CSCF including iFC filtering criteria of conventional type in the context of an SIP-type call and also using filtering criteria that are extended to take account of the new triggering conditions.

Furthermore, according to a noteworthy aspect of the method that is the subject of the invention, the latter consists in applying at least one conditional service trigger filtering criterion SIC including the state of the user agent of a called subscriber terminal when the triggering is executed on an initial request and in triggering a selective service invocation function denoted SIF(iFC+SIC), extended IFC, including at least the verification of the triggering criteria applicable to a user agent according to its calling, respectively called, position.

The selective service invocation function SIF receives all the initial SIP requests denoted IR_SIP intended for or originating from the user agents of the subscriber terminals concerned. It makes it possible to invoke at least one service application server AS, according to the state of the user agent of the called subscriber terminal.

Figure 2A:
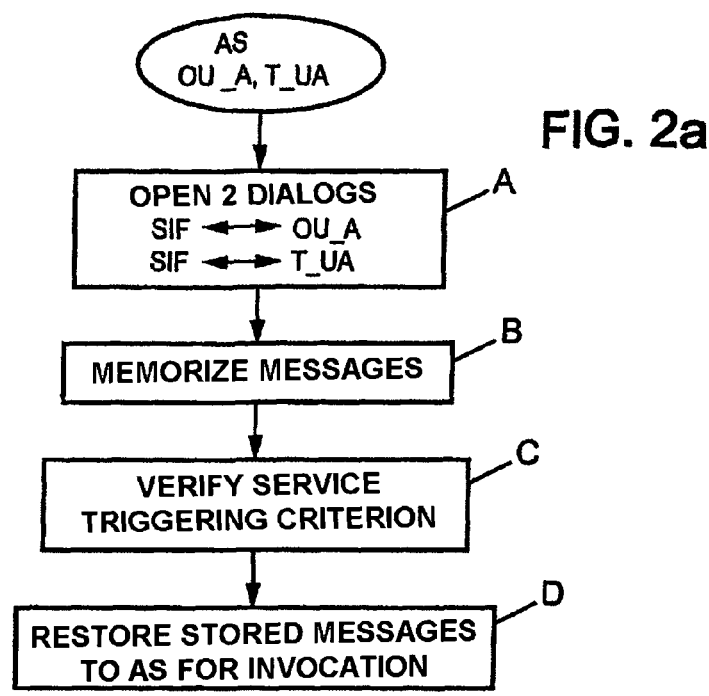
FIG. 2a represents, by way of illustration, a flow diagram of the steps in implementing the method that is the subject of the present invention.

Furthermore, according to a noteworthy operating mode of the method that is the subject of the invention represented in FIG. 2a, in a communication between an origin user agent O_UA and a terminal user agent T_UA, this method for invoking a service application server includes at least the steps consisting in opening two separate dialogs, these dialogs comprising messages between the selective service invocation function SIF and, respectively, the origin user agent O_UA and the terminal user agent T_UA. The selective service invocation function SIF thus replaces the terminal user agent T_UA in its dialog with the origin user agent O_UA respectively the origin user agent O_UA in its dialog with the terminal user agent T_UA. The step A is followed by a step B consisting in storing the messages originating from the user agents O_UA and T_UA in the two open dialogs and a step C consisting in verifying at least one conditional service triggering criterion on the two dialogs, and, if the triggering criterion is satisfied, a step D consisting in at least partly restoring the messages stored on the service application server AS, in order to trigger the invocation of the latter.

Figure 2B:
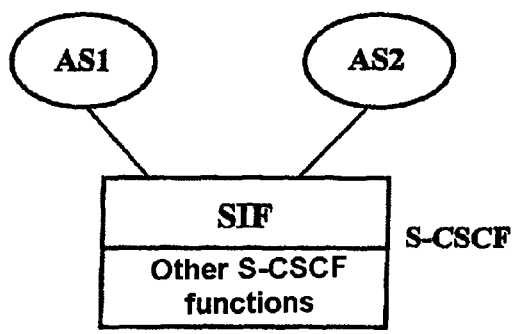
FIG. 2b and FIG. 2c represent, by way of illustration, first and second specific layout diagrams of the units involved in implementing the method that is the subject of the present invention.

As represented in FIG. 2b, the method that is the subject of the present invention particularly advantageously consists in executing the conditional triggering filtering criterion and the selective service invocation function SIF in the call server SIP, which can then comprise a proxy S-CSCF. In this case, this process can replace the prior mechanism based on iFCs.

Figure 2C:
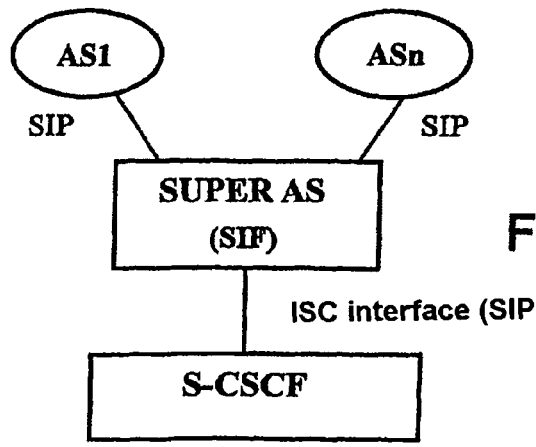

As a variant, as represented in FIG. 2c, the method that is the subject of the invention can advantageously consist in executing the selective service invocation function SIF in a specific application server, denoted SUPER AS, which is then interconnected with the call server SIF via an interface ISC according to the 3GPP standards. The interface ISC is based on the SIP protocol.

More particularly, it is indicated that the conditional service trigger filtering criteria SIC also advantageously include:
reception of a response to an initial request;
expiry of a time delay, also designated timer, measuring the duration between the reception of a provisional response and the non-reception of a final response;
reception of a request received in a confirmed SIP dialog;
reception of a request received in an unconfirmed SIP dialog;
the state of the called terminal.

Finally, the selective service invocation function SIF also advantageously comprises:
the opening and management of the SIP dialogs with an application server AS;
the correlation between SIP dialogs between the selective service invocation function and any application server AS on the one hand, and the SIP dialogs between the selective service invocation function SIF and any SIP user agent of a calling A or called B subscriber terminal, or a network server behaving as a user agent on the other hand;
the storage of any specific SIP dialog in order to subsequently restore the latter, if appropriate, to an application server AS when a conditional service trigger filtering criterion is satisfied.

The SIF function acts in B2BUA mode for any SIP dialog likely to trigger a service on a response or a subsequent request. This is what enables it to:
receive all the SIP messages relating to this dialog;
be able to insert an AS into the call or the communication outside of the initial request, which was not possible with the prior processes.

Finally, and according to a noteworthy aspect of the method that is the subject of the present invention, the selective service invocation function SIF also advantageously includes the interpretation of an SIP stop message sent by any application server asking to be withdrawn from a call between the calling subscriber terminal A and the calling subscriber terminal B via their user agents, as will be described later in the description.

Figure 3:
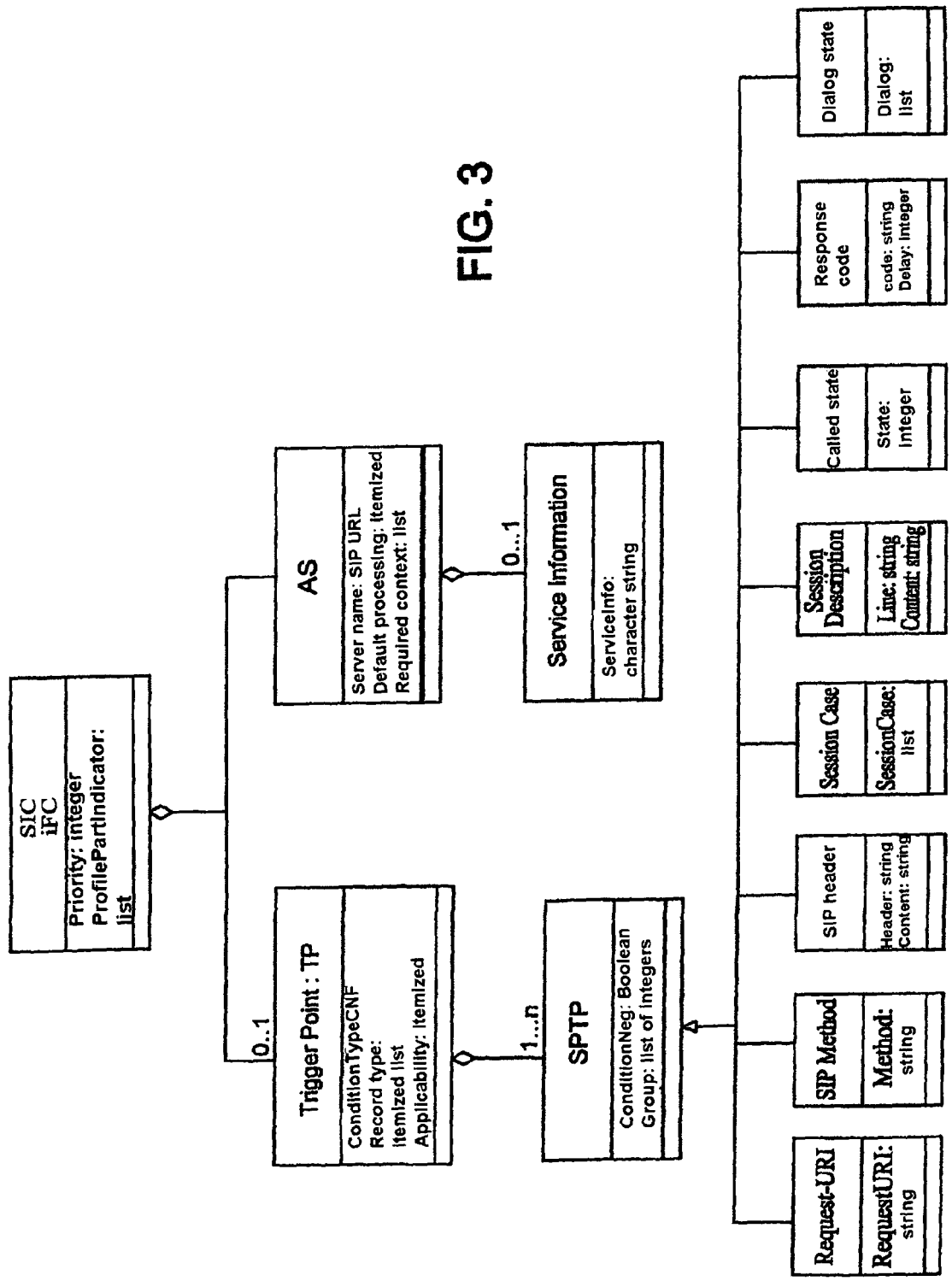
FIG. 3 represents, by way of illustration, a description of the extensions of the filtering criteria, in the form of conditional service trigger filtering criteria, making it possible to implement the method that is the subject of the present invention.

FIG. 3 represents, by way of illustration, a description in UML (Universal Markup Language) of the declaration of the conditional service trigger filtering criteria SIC in association with the declaration of the prior art of the filtering criteria iFC, all of these declarations being established according to a functional hierarchical link enabling the abovementioned criteria to be called, on implementation by the selective service invocation function SIF.

Thus, in FIG. 3, the information given in plain typeface corresponds to information representing the specifications of the conventional filtering criteria iFC and the information given in italics corresponds to information making it possible to implement and call the conditional service trigger filtering criteria SIC, extended iFC.

Among the abovementioned criteria there are:
Applicability: list type that can take the following values:
initialRequest: the filter is applicable to the initial requests IR_SIP;
subsequentRequest: the filter is applicable to the subsequent requests;
response: the filter is applicable to the responses to the initial request.
RequestedContext: list type that can take the following values:
SIPdialog: indicates that the application server AS wants to receive only the information linked to the SIP dialog when the latter is invoked;
SIPSession: indicates that the application server AS wants to receive the information linked to the SIP dialog and to the media session, that is, SDP-type negotiation when this application server is invoked;
CalleeState (called party state): making it possible to take account of state of the called party:
0: called party free;
x(>0): called party busy to the xth degree.
Response Code:
Code: indicates the code of the SIP response when the filter is applicable to the SIP responses to the initial request;
Timer: makes it possible to take account of the duration between the reception of a provisional response and the non-reception of the reception of a final response.
Dialog State:
Dialog: list type that can take the following values: confirmed or unconfirmed, this variable making it possible to take account of the state of the SIP dialog when the filter is applicable to the subsequent requests.

Because the conditional service trigger filtering criteria SIC can be applied to the SIP message, denoted M_SIP, at different levels of the SIP dialog, there are various possibilities regarding the applicability of the abovementioned criteria to the message M_SIP.

According to a first solution, the conditional service trigger filtering criteria are applicable only to the SIP requests for which the next transmission node is not an application server AS managed by the selective service invocation function SIF, to the SIP responses to the initial request not originating from an application server AS managed by the selective service invocation function SIF and to the SIP responses originating from an application server AS that has just been invoked.

Figure 1A:
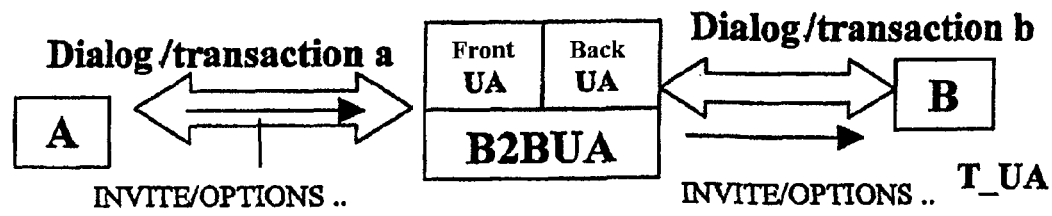
FIG. 1b represents, by way of illustration, a service logic SL hosted in an application server AS according to the prior art.
FIG. 1c represents, by way of illustration, an application server AS behaving as a terminal user agent T_UA or redirection server according to the prior art.
FIG. 1d represents, by way of illustration, an application server AS behaving as an SIP proxy according to the prior art.
FIG. 1e represents, by way of illustration, an application server AS behaving as a B2BUA user agent according to the prior art.
Figure 1B:
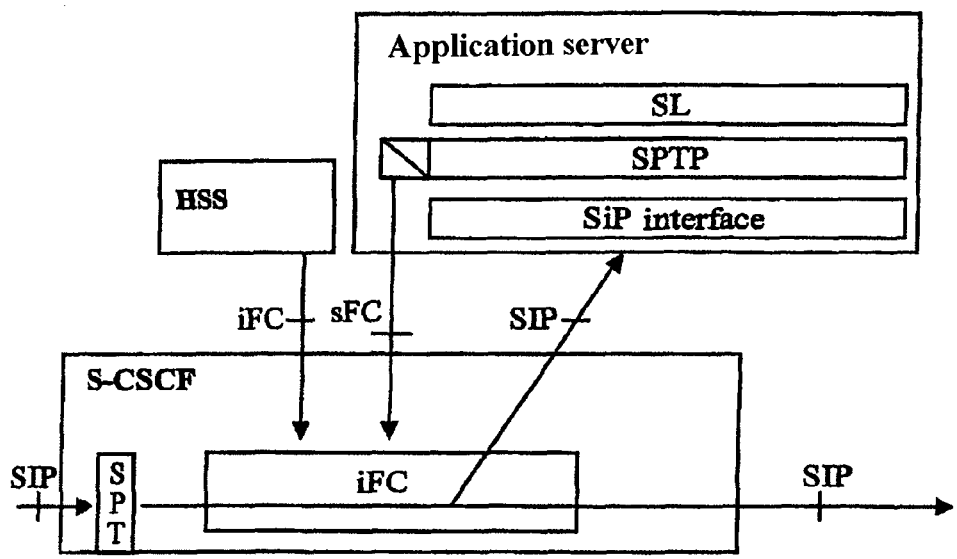
Figure 4D:
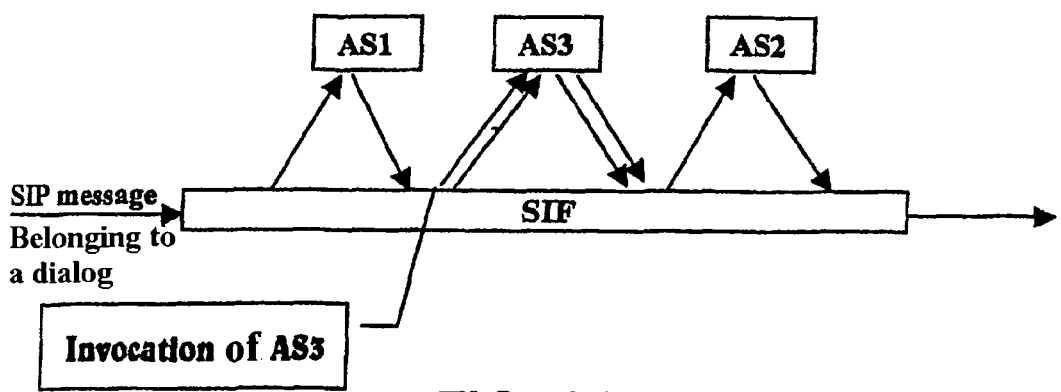
FIG. 4d represents, by way of illustration, the invocation of the server AS3 before the server AS2 invoked previously on responding with a message M-SIP belonging to a dialog.
Figure 1C:
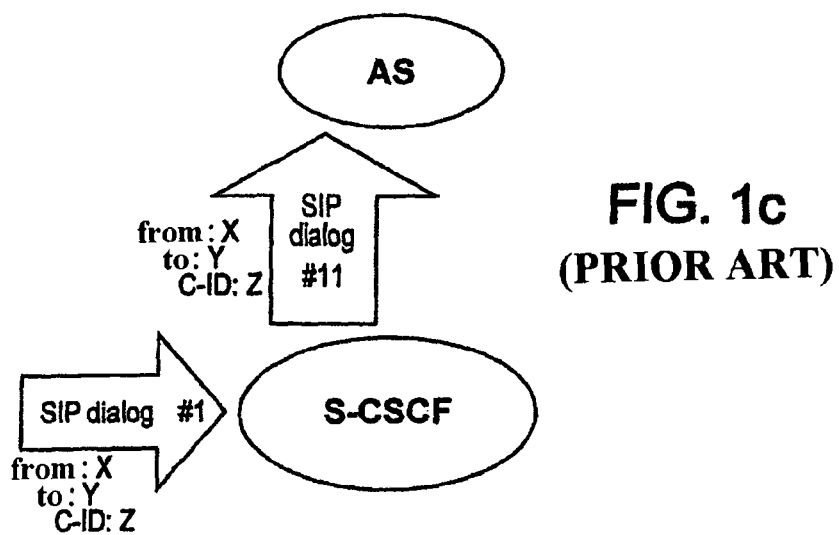
Figure 1D:
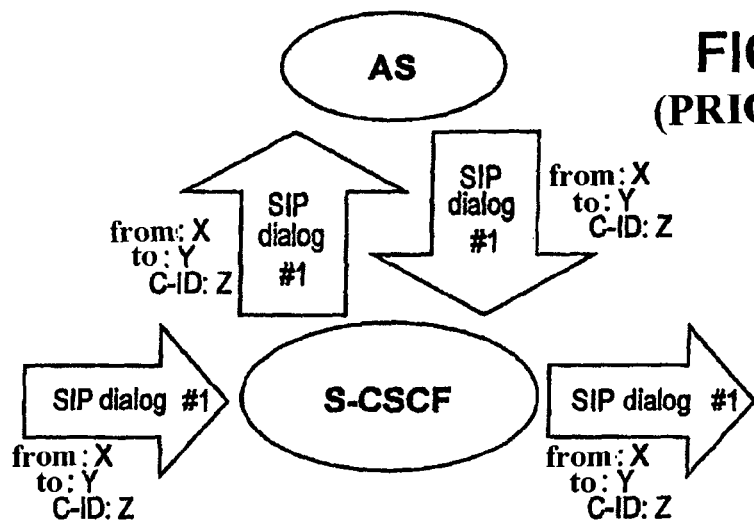
Figure 1E:
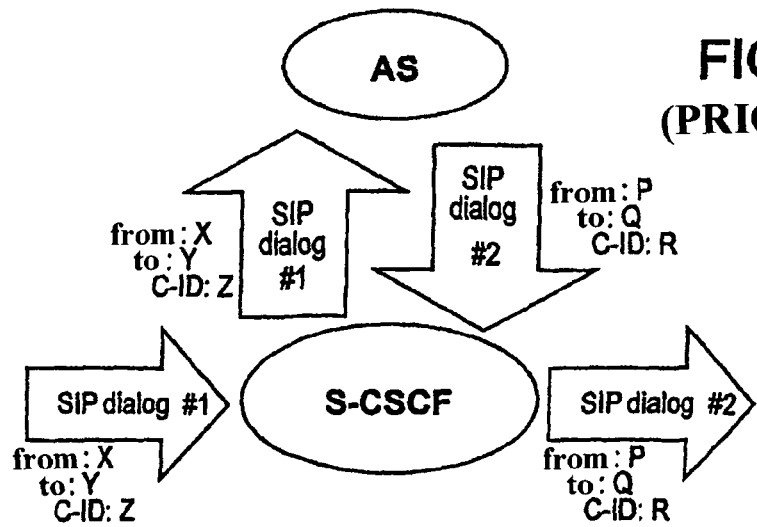
Figure 4A:
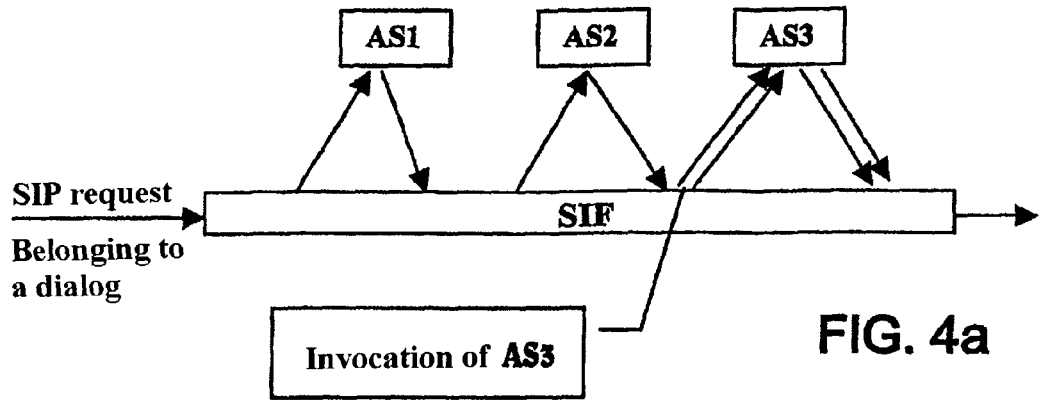
FIG. 4a represents, by way of illustration, the application of the method that is the subject of the invention to a subsequent request, belonging to an existing SIP dialog.
Figure 4B:
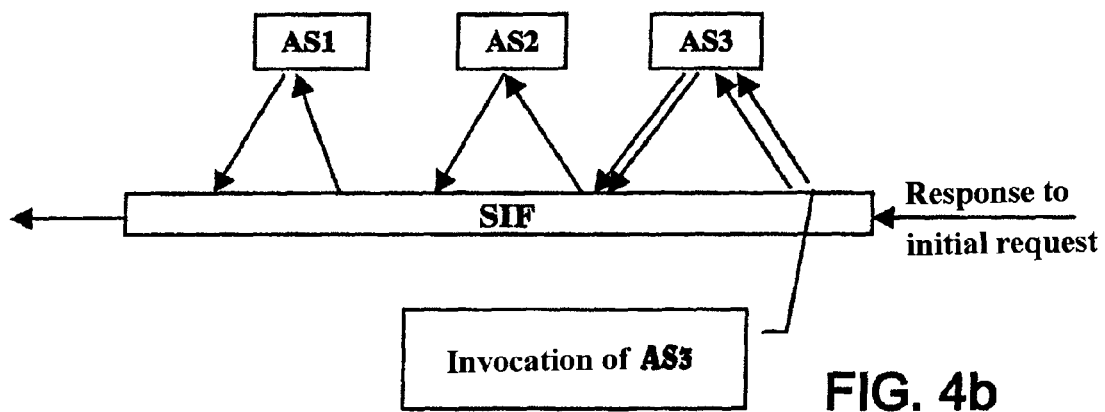
FIG. 4b represents, by way of illustration, the application of the method that is the subject of the invention to an SIP response to the initial SIP request.

Thus, in this first solution, an application server AS invoked following the reception of a message belonging to a dialog as represented in FIG. 4a is always inserted after any other application servers AS1 and AS2 invoked previously. The server invoked here is the server AS3 as represented in FIG. 4a.

FIG. 4a represents the application of the conditional service trigger filtering criteria SIC to an outgoing request, that is, in response to the initial request received by the selective service invocation function SIF.

In this situation, the conditional service trigger filtering criteria SIC can be used to invoke the application server AS3, following the application of a conditional service trigger filtering criterion SIC to the SIP response received from the preceding SIP proxy.

Figure 4C:
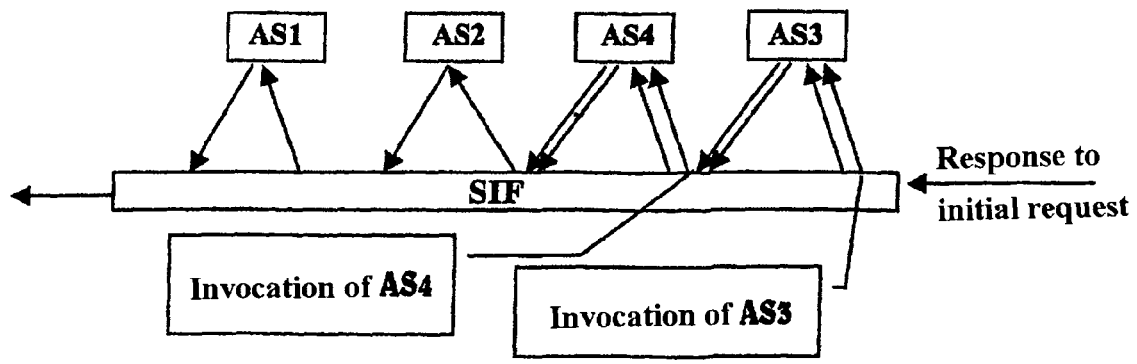

Finally, FIG. 4c represents the application of the conditional service trigger filtering criteria SIC to an incoming SIP response where two application servers S3 and S4 are invoked.

The abovementioned invocation is performed in response to the initial request for example, therefore constituting an incoming response. The invocation of the application server AS3 following the application of a conditional service trigger filtering criterion SIC to the SIP response received from the preceding SIP proxy is performed, as represented in FIG. 4c, followed by the invocation of the application server AS4 following the application of a conditional service trigger filtering criterion SIC to the SIP response received from the application server AS3 after its invocation.

According to a second solution, the conditional service trigger filtering criteria SIC are applicable to all the messages that can trigger the invocation of an application server AS.

According to this second solution, an application server AS, following the reception of a message belonging to an SIP dialog, can be inserted before an application server AS invoked previously. FIG. 4d represents the invocation of the server AS3 before the server AS2 invoked previously on responding with a message M_SIP belonging to a dialog. The invocation of the application server AS3 is performed following the application of a conditional service trigger filtering criterion SIC to the message M_SIP received.

The abovementioned second solution thus enables any application server invoked following the reception of a message belonging to an SIP dialog to be inserted into this dialog, according to an order relation, prior to an application server previously invoked in this dialog.

A more detailed description of the implementation of the selective service invocation function SIF in an operating mode that is transparent with respect to any application server AS, each working according to a standard behavior, according to the IETF and 3GPP standards, will now be given in association with FIGS. 5a, 5b and 6a, 6b, 6c, 7a, 7b, 8a and 8b.

In the transparent mode, the selective service invocation function SIF restores to the application server AS the stored messages by simulating a real dialog between the origin user agent and the terminal user agent.

The abovementioned embodiment of the selective service invocation function SIF entails implementing a relay functionality for an SIP message received in a first dialog, this relay being performed in a second dialog and indicating that the selective service invocation function SIF, before forwarding this message, modifies all the headers containing information relating to the SIPX dialog, headers such as "FROM Tag", "To Tag", Call-id, Cseq, Contact, Route, Record Route, Via, such that the message sent, and therefore relayed, corresponds to a message generated by the user agent UA also executing the relayed second dialog.

The principle of this transparent operating mode is thus based on the involvement of the selective service invocation function SIF in B2BUA mode in all the dialogs involving subscribers having one or more services provided by the application servers managed by the abovementioned selective service invocation function SIF and which are not triggered on the initial request.

The selective service invocation function SIF thus has the conditional service trigger filtering criteria SIC of each subscriber concerned. These criteria can be downloaded in particular on connection of a subscriber terminal concerned, to thus establish the abovementioned conditional service trigger filtering criteria SIC.

If, during the SIP dialog, a conditional service trigger filtering criterion SIC is satisfied, then the selective service invocation function SIF invokes the application server AS concerned and retransmits to it all the SIP messages relating to this SIP dialog in a way enabling it to be inserted into this dialog.

Consider, with reference to FIG. 5a, the situation of reception of an SIP message by the selective service invocation function SIF outside of the invocation phase of an application server AS.

The selective service invocation function SIF checks whether one or more conditional service trigger filtering criteria SIC exist for this message. It is assumed then that the filtering criteria SIC=$\{SIC_j\}_{j=1}^{j=J}$ are available. The message M_SIP is considered in its context: for example: when the selective service invocation function SIF receives a response 200 to an INVITE request of the SIP protocol, only the conditional service trigger filtering criteria SIC concerning this response are considered.

As represented in FIG. 5a, if the message M_SIP is an initial request, this condition being verified in the test 100 by the test M_SIP=IR? where IR designates an initial request originating from a user agent of a subscriber terminal A or transmitted by a network server behaving in B2BUA mode or as a user agent and intended for the user agent of a subscriber terminal B for which no conditional service trigger filtering criterion SIC exists, SIC=Ø, but initiating an SIP dialog that can trigger a service managed by the selective service invocation function SIF, this condition being verified in the test 101, the latter then acts in B2BUA mode. The SIF function generates a new request containing the same information as that received in the initial request, but generates a new SIP dialog by working in B2BUA mode in the step 102, this new initial request being transmitted to the next node by calling the steps 109, 110 and 111, which will be described later in the description. The steps 109 and 110 can be merged.

In these conditions, the selective service invocation function SIF manages an SIP dialog with the user agent of the calling subscriber terminal A and another SIP dialog with the user agent of the subscriber terminal B.

On the other hand, if at least one conditional service trigger filtering criterion exists for the message M_SIP received, test 101 SIC≠Ø? represented in FIG. 5a, the selective service invocation function then carries out the following operations:

Discrimination of the message M_SIP as constituting or not constituting an initial request establishing or not establishing an SIP dialog.

The triggering of the services on the transactions not establishing any SIP dialog created by certain requests like the OPTIONS, REGISTER, MESSAGE, and other requests, is often linked to the initial request and not to the responses to this request. In order not to complicate the handling process at the level of the selective service invocation function SIF, and according to the method that is the subject of the invention, the same application server AS invocation procedure is retained and the selective service invocation function SIF does not then work in B2BUA mode for these requests.

The corresponding operations are represented by the test step 100 in FIG. 5a consisting in verifying whether the message M_SIP is an initial request by the test M_SIP=IR?.

On a negative response to the test 100, the SIF function calls an operating mode corresponding to a procedure 200 according to which the message M_SIP belongs to an existing SIP dialog D_SIP, this procedure being described later in the description in association with FIG. 5b.

On the other hand, on a positive response to the test 100, the message M_SIP is an initial request and this test is then followed by the abovementioned test 101.

On a positive response to the test 101 SIC≠∅, the message M_SIP initiating a dialog D_SIP, a step 103 is called to check this message with a first conditional service trigger filtering criterion SIC in terms of priority not yet tested and which is applicable to the latter.

In the step 103 of FIG. 5a, this test is denoted M_SIP=$SIC_j$?

On a negative response to the above-mentioned verification test, that is, if $SIC_j$ is not satisfied but there remains at least one filtering criterion SIC not yet verified, this situation being represented by the negative response to the test 103 of FIG. 5a with j≦J, the verification process is recommenced by incrementing j=j+1 in the step 104 and return by call to the step 103.

If, on the other hand, there is no remaining untested conditional service trigger filtering criterion corresponding to the message M_SIP, this situation being represented by the negative response to the test 103 with, however, j>J, then the selective service invocation function SIF proceeds to call a step 109 consisting in terminating the initial request IR, that is the message M_SIP, in other words, behaves as a terminal user agent T_UA for this request, the step 109 being followed by a step 110 for generation of a new initial request denoted N_IR containing the same received information as in the initial request IR but initiating a new outgoing SIP dialog, denoted ND_SIPs, and transmission in the step 111 of the new initial request N_IR to the next node by performing a standard SIP routing defined, for example, in the recommendation RFC 3261. The SIF function thus behaves in B2BUA mode for the SIP dialog initiated by this request.

On the other hand, on a positive response to the test 103, the message M_SIP then satisfies the conditional service trigger filtering criterion $SIC_j$. In this situation, the selective service invocation function SIF acts as a terminal user agent T_UA for the corresponding request. The step 103 is then followed by a step 105 for creation of an incoming dialog D_SIP, denoted D_SIPe=("a", SIF, A). This dialog is then designated for simplicity dialog "a".

The step 105 is then followed by a step 106 consisting in generating a new request N_IR containing the same fields as those of the initial request, that is, those of the message M_SIP, but initiating a new outgoing dialog presenting new Call_ID and FROM tag headers, this dialog being denoted D_SIPs=("b", SIF, AS). This dialog is designated for simplicity dialog "b".

In the new request, N_IR, the selective service invocation function SIF adds the parameter P-Original-Dialog and inserts the URI of the application server AS specified by the conditional service trigger filtering criterion $SIC_j$ that has been satisfied, this insertion being performed in the header of the Route field followed by its own URI according to the 3GPP recommendation. The step 107 is then followed by a step 108 for transmission of the new duly completed request N_IR to the application server AS. In these conditions, the application server AS can thus act as terminal user agent or T_UA, as Proxy or as B2BUA.

The operations carried out by the selective service invocation function SIF according to the behavior of the application server AS are represented in FIG. 5a.

If, as represented in the test 108a of FIG. 5a, the application server AS behaves as a terminal user agent T_UA, the latter does not therefore return the received request N_IR. The SIF function then discards any conditional service trigger filtering criteria $SIC_k$≠j concerning the initial request IR.

In this situation, in response 1 to the test 108a of FIG. 5a, the application server AS does not therefore create a new dialog and the SIF function then simply correlates the dialog "a" with the dialog "b". The SIF function transmits the messages M_SIP received in the dialog "a" to the dialog "b" and vice-versa. These operations and the dialogs "a" and "b" are represented in FIG. 6a.

If, on the other hand, according to the situation of response 2 to the test 108a, the application server AS behaves as a proxy, the latter then returns the initial request, possibly modified. In this case, if other conditional service trigger filtering criteria $SIC_k$≠j have not yet been submitted for verification, the SIF function returns to the verification step, or to the step 103 of FIG. 5a. Otherwise, the SIF function goes back to the succession of the steps 109, 110 and 111. The application server AS does not create a new dialog and the SIF function simply then correlates the dialog "a" with the dialog "b". The SIF function transmits the SIP messages received in the dialog "a" to the dialog "b" and vice-versa. The corresponding dialogs are represented in FIG. 6b.

If, according to the response 3 to the test 108a of FIG. 5a, the application server AS behaves in B2BUA mode, the latter terminates the request that it receives and returns a new request initiating a new dialog, designated incoming dialog "aa". The SIF function correlates the outgoing dialog "b" with the incoming dialog "aa" using the field P-Original-Dialog. In this case, if other conditional service trigger filtering criteria $SIC_k$≠j in the list have not yet been verified, the SIF function goes back to the verification step, that is to the test 103 of FIG. 5a. Otherwise, it calls the successive steps 109 to 111 described previously. In all cases, a new SIP dialog, designated dialog "b", is created. Then, the SIF function carries out the following operations:

correlation of the incoming dialog "a" with the outgoing dialog "bb" and relaying of the SIP messages received in the dialog "a" to the dialog "bb" and vice-versa;

correlation of the incoming dialog "aa" with the outgoing dialog "b" and relaying of the messages M_SIP received in the incoming dialog "aa" to the dialog "b" and vice-versa.

The corresponding dialogs are represented in FIG. 6c.

A more detailed description of the operating mode of the SIF function in a negative response to the test 100 of FIG. 5a when the SIP message belongs to an SIP dialog will now be described in association with FIG. 5b.

In such a case, the application servers AS possibly invoked can behave either in B2BUA mode or in proxy mode according to a so-called "Stateful" dialog, or in so-called "stateless" dialog proxy mode. These concepts are described in the recommendation RFC 3261. The latter dialog occurs only if the triggering takes place on a response to the initial request.

In this situation, D_SIP("m", SIF, A) designates the dialog to which the message M_SIP belongs, this dialog being designated inciting dialog "m" and the dialog with which this dialog is correlated, the dialog D_SIP("n", SIF, B). This correlation was done by the SIF function following the reception of an initial request triggering no AS or following the invocation of an AS according to the procedures according to the invention. This dialog is designated precursor dialog "n". One of these dialogs is an incoming dialog and the other is an outgoing dialog.

The SIF function then works on verification criteria in a step 201 for the first conditional service trigger filtering criterion $SIC_j$, if one exists for this message, in terms of priority not yet tested applicable to the message M_SIP. In the step 201, the verification is denoted M_SIP≡SIC$_j$?.

On a negative response to the test 201 and for j≦J, that is, if at least one criterion SIC$_k$≠j yet remains unverified, the SIF function returns to the call to the verification step 201 by an incrementation step 202, j=j+1, to go on to the next criterion.

On the other hand, if no untested criterion SIC corresponding to the message M_SIP remains, that is, on a negative response to the test 201 for j>J, then the abovementioned SIF function calls a step 220 for transmission of the message M_SIP in the dialog "n".

On the other hand, on a positive response to the test 201, with the message M_SIP satisfying the criterion SIC$_j$, the SIF function creates a new outgoing SIP dialog, denoted D_SIPs= ("b", SIF, AS), to the application server AS which will hereinafter be designated following outgoing dialog "b".

The step 203 is concurrent with a step 204 consisting in generating a new initial request, denoted N_IR$_m$, containing the same information as was contained in the original initial request IR and that had created the inciting dialog "m". In the abovementioned new request, the SIF function adds a field P_Original_Dialog and inserts the URI of the application server AS at the head of the ROUTE field followed by its own URI, then proceeds to transmit the new initial request N_IR$_m$ in the step 205 to the application server AS. The steps 203 and 204 can be merged.

The behavior of the SIF function then depends on the operating mode of the application server AS.

If, as is represented in the test 206 of FIG. 5b, the application server AS acts in B2BUA mode according to the situation (1), then the abovementioned application server proceeds, in a step 207, to terminate the request N_IR$_m$, that is, behaves as T_UA for this request, initiates a new incoming dialog D_IPe ("a",SIFAS) hereinafter designated renewed incoming dialog "a". The application server AS creates, in the step 209, a new request N_RIa in the context of the abovementioned new dialog "a" then transmits the new request to the SIF function in the step 210. The steps 207, 208, 209 and 210 can be combined.

On reception of the abovementioned request, in the step 211, the SIF function correlates the following outgoing dialog "b" with the renewed incoming dialog "a" and restores in the step 212 the stored messages exchanged between the dialogs "n" and "m" in the dialogs "a" and "b". As long as the message that has triggered the invocation of the application server AS has not yet been sent to the latter, because the restoration phase still applies, this application server AS simply relays the messages between the renewed incoming dialogs "a" and the following outgoing dialogs "b".

In this restoration phase, the SIF function acts to reproduce in the dialogs "a" and "b" the exchange of the messages that took place in the dialogs "n" and "m". In the abovementioned dialogs "n" and "m", one is incoming "e" and the other is outgoing "s". Reproduction consists in reproducing in chronological order all the other possible SIP responses and transactions, except for the transactions linked to the methods that are not supported by the application server AS, such as, for example, the PRACK method, because the SIF function knows that they are SIP messages that are not supported by the AS from the information contained in the initial request sent by the latter, and from the transactions that occurred within the dialogs "n" and "m" for which the final response was different to 491 "Request Pending", for example re-INVITE, UPDATE.

The reproduction of this exchange can be performed as follows:
if it is a response to the initial request, the latter is sent in the renewed dialog "a" without waiting for a return from the application server AS in the dialog "b";
if it is a request initiating a transaction, and if this request has been received in the incoming dialog "e", the SIF function sends the latter in the outgoing dialog, the following dialog "b". Then, the SIF function, once this request is forwarded in the dialog "a" by the AS, responds thereto with the received responses to this transaction in the outgoing dialog "s". If this request has been received in the outgoing dialog "s", the SIF function sends it in the renewed dialog "a". Then, when the abovementioned request has been forwarded in the following dialog "b", the SIF function responds thereto with the responses received to this transaction in the incoming dialog "e".

When the message that has triggered the invocation of the application server AS is sent to the latter, the invocation of this application server is considered to be executed, and the application server AS having received the context of the call is inserted into the latter and can control it.

The SIP message forwarded by the application server AS in the step 212a, following the restoration of the SIP message having triggered this invocation, consists of a message designated M'_SIP, which is dealt with as follows.

The message M'_SIP is submitted to a test 219' verifying the similarity or lack of similarity of name with the message M_SIP. On a negative response, a return to the start 200 is provided to submit the message M'_SIP to all the procedure. The return to the step 200 is done with the message M'_SIP belonging to the dialog "m'" correlated with the dialog "n'".

The dialog "m'" is:
the dialog "a", if the message M'_SIP has been sent by the application server AS in this dialog;
the dialog "b", if the message M'_SIP has been sent by the application server AS in this dialog.

The dialog "n'" is:
the dialog "n", if the message M_SIP is received in the dialog "a";
the dialog "m", if the message M_SIP is received in the dialog "b".

Otherwise, on a positive name similarity response, a step 219'a is called. If, as represented in the step 219'a, the message M'_SIP returned by the application server AS is part of the messages to which the filtering criteria SIC can be applied, M'_SIP≡SIC? positive response and j≦I, then the SIF function provokes a return to the verification step 201 via the step 202.

Otherwise, on a negative response to the test 219'a, for j>J, or in the absence of other filtering criteria SIC applicable to the message M'_SIP, the SIF function proceeds to call the transmission in the step 220 of the message M_SIP, according to the dialog correlated with the dialog "b". Depending on the behavior of the application server AS and any other filtering criteria SIC, one or more other application servers can be invoked and inserted into the call.

When the application server AS works in the situation (1) in B2BUA mode, it is possible to reduce the number of messages to be forwarded to the application server AS to give it the context of the call and insert the latter into this call, in the case where this application server AS is interested only in the information linked to the SIP dialog. The solution consists in adding a parameter in the conditional service trigger filtering criterion SIC indicating that the application server AS is interested only in the information linked to the SIP dialog without the information linked to the negotiation of the media session, that is, of the SDP exchange. The abovementioned parameter can be the Requested Context parameter.

When the SIF function invokes an application server AS having satisfied a filtering criterion $SIC_j$ containing such a parameter, this parameter being able to correspond to the Requested Context=dialog parameter, the latter simply transfers, to the above-mentioned application server, the initial request, which will create the following outgoing dialog "b" with this application server AS. Then, when this above-mentioned application server returns this request initiating another incoming dialog with the SIF function in the step 208, initiation of the incoming dialog "a":

if the application server AS is invoked following the reception of a response to the initial request, the SIF function responds to this request with this response;

if the application server AS is invoked following the reception of a request belonging to the dialog, the SIF function responds to this request with the last response received to the initial request in the outgoing dialog. Then, if the call is not yet set up, the SIF function sends the request triggering this invocation. Otherwise, it reproduces the acknowledgement transaction ACK in the renewed "a" and following "b" dialogs before sending the request triggering this invocation in the above-mentioned dialog, if this request has been received in the incoming dialog or in the renewed dialog "a" otherwise.

Then, when the message M_SIP having satisfied the criterion SICj is transmitted to the AS, at the end of the message restoration phase, if the SIP message returned by the latter is part of the messages to which the filtering criterion SIC can be applied, the SIF function goes back to the verification step 201. Otherwise, the SIF function goes back to the step 213. Depending on the behavior of the application server AS and any other filtering criteria SIC, one or more other application servers AS can be invoked and inserted into the call.

The relay operations based on replication of the SIP messages by the SIF function are then executed according to the incoming, respectively outgoing, dialog quality of the inciting dialog "m" as represented in the test 213 D_SIPM? of FIG. 5*b*.

If the test D_SIPm? indicates that the dialog "m" is an incoming dialog, response e to the test 213, then, the SIF function proceeds to relay by replication the messages received in the incoming dialog "m" and intended for the terminal user agent B in the following outgoing dialog "b", the messages received in the following dialog "b" and intended for the origin user agent A in the inciting dialog "m", the messages received in the renewed incoming dialog "a" and intended for the terminal user agent B in an updated precursor outgoing dialog, dialog "nn", the messages received in the updated precursor outgoing dialog, dialog "nn" and intended for the origin user agent A in the renewed incoming dialog "a".

The abovementioned dialogs are represented in FIG. 7*a* in this situation. The updated precursor outgoing dialog "nn" is none other than the dialog "n" precursor dialog "n" correlated with the previously cited inciting dialog "m", if no other application server AS is invoked, or the dialog created following the invocation of another application server. If another application server (ASx) has been invoked and inserted after the application server (AS), the dialog nn corresponds to the outgoing dialog correlated with the dialog "a" following this invocation.

If, on the other hand, the inciting dialog "m" is an outgoing dialog, the SIF function proceeds to relay by replication the messages received in the above-mentioned inciting dialog "m" intended for the origin user agent A in the renewed incoming dialog "a", the messages received in the renewed incoming dialog "a" and intended for the terminal user agent B in the inciting dialog "m", the messages received in the renewed incoming dialog "a" and intended for the origin user agent in the following outgoing SIP dialog "b", the messages received in the updated precursor outgoing message "nn" and intended for the terminal user agent in the following outgoing dialog "b".

The various corresponding dialogs when the inciting dialog "m" is an outgoing dialog are represented in FIG. 7*b*. As in the case of FIG. 7*a,* the dialog "nn" is the precursor dialog "n", if no other application server AS is invoked or the outgoing dialog created following the invocation of another application server AS. If another application server (ASx) has been invoked and inserted after the application server (AS), the dialog nn corresponds to the incoming dialog correlated with the dialog "b" following this invocation.

If, however, the application server AS, in response to the test 206, acts in proxy mode according to the situation (2), either in stateful dialog mode or in stateless dialog mode, the abovementioned application server does not create another SIP dialog.

In this situation, the SIF function acts to reproduce in the following dialog "b" the exchange of the messages occurring in the inciting dialog "m".

To this end, the SIF function reproduces, in chronological order, all the any other responses and transactions occurring in the inciting dialog "m" in the following dialog "b", apart from the transactions associated with the methods that are not supported by the application server AS, such as the abovementioned PRACK method, when the initial request forwarded by the application server AS indicates that this method is not supported, and the transactions that occurred within the dialogs for which the final response was 491 "Request pending", such as "RE-INVITE, UPDATE".

The reproduction operation in the step 216 is denoted:

$$B\_SIP("m") \longleftrightarrow D\_SIP("b")$$

The replication of this exchange can be performed as follows:

if it is a response to the initial request IR, the latter is sent in the following dialog "b" without awaiting a return from the application server AS;

if it is a request initiating a transaction, the latter is sent in the following dialog "b".

Then, when the application server AS has forwarded this request, the SIF function sends it any responses received to this request. When the message M_SIP, having triggered the invocation of the application server AS, is sent to the latter, the invocation of the abovementioned application server is considered to be executed. The application server AS has received the context of the call and is inserted into the call. The number of messages to be forwarded to the server AS to give the latter the context of the call and insert it into this call can be reduced in the case where the abovementioned application server AS is interested only in the information associated with the SIP dialog. The solution hereinbelow can be considered similar to the solution described with the B2BUA operating mode of the application server AS, that is, to add a parameter such as the abovementioned requested context parameter in the filtering criterion SIC indicating that the application server AS concerned is interested only in the information associated with the SIP dialog. The operating mode is then substantially the same as that described previously when the application server AS is operating in B2BUA mode to reduce the number of messages to be returned to the application server AS in the case where the latter is interested only in the information associated with the SIP dialog. However, it should be indicated that, in proxy mode, the application server AS creates no new dialog and any request is returned in the same existing following dialog "b".

The SIP message, forwarded by the application server AS following the restoration of the SIP message having triggered this invocation in the step 218, consists of a message designated M'_SIP, which is processed as follows.

The message M'_SIP is submitted to a test 219 verifying the similarity or absence of similarity of name with the message M_SIP. On a negative response, a return to the step 201 is provided to submit the message M'_SIP to all the procedure. The return to the step 200, then 201, is done with the message M'SIP belonging to the dialog "b" correlated with the dialog "n". Otherwise, on a positive name similarity response, a step 219a is called.

If, as represented in step 219a, the message M'_SIP returned by the application server AS is part of the messages to which the filtering criteria SIC can be applied, this test being represented in the step 219a by the relation:

M'_SIP=SIC?positive response for j≦J, then, the SIF function provokes a return to the verification step 201 via the step 202.

Otherwise, on a negative response to the test step 219a, and for j>J, that is in the absence of other filtering criteria SIC applicable to the response messages M'_SIP, the SIF function proceeds to call for the transmission in the step 220 of the message M_SIP according to the dialog correlated with the dialog "b", as described previously. Depending on the behavior of the application server AS and any other filtering criteria SIC, one or more other application servers can be invoked and inserted into the call.

The relay operations based on the duplication of SIP messages in the corresponding dialogs, when the application server AS is working in proxy mode, depend on the incoming, respectively outgoing, dialog quality of the inciting dialog "m". If, as represented in the test 221, the dialog "m" denoted D_SIP("m") is an incoming dialog, alternative e of the test 221, the SIF function executes the relaying by the application of the messages received from the application server AS in the following dialog "b" and intended for the origin user agent A in the inciting dialog "m", of the messages received from the application server AS in the following dialog "b" and intended for the terminal user agent B in the updated precursor dialog "nn", of the messages received from the origin user agent A, respectively terminal user agent B, in the inciting dialogs "m" and in the updated precursor dialogs "nn" in the following dialog "b".

The corresponding dialogs are represented in FIG. 8a. The updated precursor dialog "nn" is the precursor dialog "n", if no other application server AS is invoked, or the outgoing dialog created following the invocation of another AS. If another application server (ASx) has been invoked and inserted after the application server (AS), the dialog "nn" corresponds to the outgoing dialog correlated with the dialog "b" following this invocation.

If, however, the dialog "m" dialog D_SIP("m") is an outgoing dialog, alternative s of the test 221, the SIF function proceeds to relay by replication the messages received from the application server AS in the following dialog "b" and intended for the origin user agent A in the updated precursor dialog "n", the messages received from the application server AS in the following dialog "b" and intended for the terminal user agent B in the inciting dialog "m", all the messages received from the origin user agent A and from the terminal user agent B in the updated precursor dialog "nn" and inciting dialog "n" in the following dialog "b", when the application server acts in the so-called Stateful Dialog mode, that is, when the application server AS has inserted its URI in the Record Route field header of the initial request, the only responses to the initial request received in the inciting dialog "m", if the application server AS acts in the so-called Stateless Dialog mode, that is when the application server has not inserted its URI in the Record Route header of the abovementioned initial request.

The abovementioned various dialogs are represented in FIG. 8b.

The dialog "nn" is the dialog "n", if no other application server AS is invoked or the outgoing dialog is created following the invocation of another application server AS. If another application server ASx has been invoked and inserted after the application server AS, the dialog nn corresponds to the incoming dialog correlated with the dialog "b" following this invocation.

A space-time diagram of a particular embodiment of the method that is the subject of the invention, in transparent mode, is now described in conjunction with FIG. 9.

The abovementioned embodiment is given by way of example and illustrates the case of a service being triggered on receipt of the response 180 "Ringing" to an "INVITE" request from the CRBT service or from the Call Waiting service, for example, for a voice-over-IP network call for example. It is assumed that the logic of this service behaves in B2BUA mode and, before receiving the abovementioned response 180, simply relays the messages between the dialogs "b" and "a". Then, on reception of the response 180 "Ringing" from the user terminal B, the SIF function working in B2BUA mode transmits a response 183 "Session Progress" to the origin user agent A to prepare the media connection for example and forwards it with the response 180 "Ringing".

The chronology of the SIP messages transmitted between the terminal of the origin user agent O_UA and of the end terminal B and the terminal user agent of the latter is then as follows:

1: INVITE from A to S-CSCF;
2: INVITE from S-CSCF to the SIF function, which in this example is represented implemented outside the call server S-CSCF;
3: INVITE from the SIF function to the call server S-CSCF;
4: INVITE from S-CSCF to the user agent of the terminal B;
5: "Ringing" from the terminal B to the call server S-CSCF;
6: "Ringing" from S-CSCF to the SIF function;
7: INVITE from the SIF function to the application server AS working in B2BUA mode;
8: INVITE from the application server AS to the SIF function;
9: "Ringing" from the SIF function to the application server AS;
10: Session Progress from the application server AS to the SIF function; the Session Progress message is relayed to S-CSCF;
11: "Session Progress" from the SIF function to the server S-CSCF;
12: "Session Progress" from the server S-CSCF to the calling origin terminal A;
13: "Ringing" from the application server AS to the SIF function;
14: "Ringing" from the SIF function to the call server S-CSCF;

15: "Ringing" from the call server S-CSCF to the calling origin terminal A.

The dialogs m, n, "a" and "b" are represented in the drawing.

In both cases, when the application server AS has been invoked, the SIF function simply transfers, using the necessary adaptations, the messages originating from A in the dialog "m" to the application server AS in the dialog "b" and the messages received from the application server AS in the dialog "b" to the calling terminal A in the dialog "m".

The same applies regarding the messages originating from the called terminal B in the dialog "n" to the application server AS in the dialog "a" and the messages received from the application server AS in the dialog "a" to B, called terminal, in the dialog "n".

The SIP messages, according to their chronology, belong to the following dialogs:

1, 12, 14, 15 dialog "m";
7, 10, 13 dialog "b";
8, 9 dialog "a";
3, 4, 5, 6 dialog "n".

One embodiment of the SIF function not transparent to the application server AS, but presenting the advantage of a reduction in the number of SIP messages transmitted and also of simplifying the processing at the level of the abovementioned SIF function, as well as reducing the delay in transferring the call context to the application server AS, will now be described in conjunction with FIGS. 10a, 10b and 10c.

The abovementioned embodiment differs from the embodiments described previously in conjunction with FIGS. 5a and 5b only in the processing associated with the invocation of an application server AS on reception of an SIP message belonging to an SIP dialog satisfying a filtering criterion SIC, that is, the operating mode of FIG. 5b is substantially replaced by that of FIG. 10a as described.

With reference to the abovementioned FIG. 10a, we will therefore consider the existence of a message M_SIP, of filtering criteria $SIC=\{SIC_j\}_{j=1}^{j=J}$ and, in accordance with the initial conditions of the operating mode of the method that is the subject of the invention represented in FIG. 5b, the existence of the inciting dialog D_SIP("m", SIF, A, B) and the precursor dialog D_SIP("n", SIF, A, B) correlated with the latter.

In the operating mode of the SIF function, it should be indicated that the latter works in B2BUA mode to implement the method that is the subject of the invention in non-transparent mode.

On reception of the message M_SIP, the SIF function verifies, in the step 300, this message against the filtering criteria SIC and, in particular, the first filtering criterion $SIC_j$ in terms of priority not yet tested.

This operation is denoted verification M_SIP≡S_$SIC_j$? in the step 300. If the filtering criterion $SIC_j$ is not satisfied, and if there remains at least one filtering criterion $SIC_{k\neq j}$ not yet verified, as represented in negative response to the step 300 for j≦J, then the SIF function calls a step 301 to go on to the next filtering criterion SIC symbolized by the relation j=j+1 and by returning to the call to the step 300.

If, however, there remains no untested filtering criterion SIC that corresponds to this message, as represented in the negative step for the test 300 for j>J, then the SIF function proceeds to call a step 309 for transmission of the message M_SIP in the dialog "n".

If, however, the message M_SIP satisfies the filtering criterion $SIC_j$, then the SIF function proceeds to create a dialog D_SIP ("c", SIF, AS), the SIF function then transmits, in a step 303, to the application server AS, all the messages exchanged in the inciting dialog "m". The steps 302 and 303 can be executed in a single step in which the SIF function sends all the messages received in the dialog "m" in another dialog "c" to the application server AS. The dialog identifiers of these messages differ from those of the above-mentioned inciting dialog "m" and from those of the abovementioned precursor dialog "n". They thus belong to the dialog created in the step 302 designated dialog "c", called following dialog. When all these messages are sent to the application server AS, the invocation of the latter is considered to be executed. The operation for transmission of the messages in the step 303 is denoted:

Transmission M_SIPc→AS.

This transmission is performed in the dialog D_SIP("c", SIF, AS).

To reduce the number of messages to be transmitted to the application server S in order to give it the call context and insert the latter into this call, in the case where this application server AS is interested only in the information associated with the SIP dialog, it is possible, as mentioned previously in the description in association with FIG. 5b in particular, to add a parameter to the filtering criterion SIC, such as the Requested Context parameter, indicating that the application server AS concerned is interested only in the information associated with the SIP dialog. When the SIF function then invokes an application server AS following the verification of a filtering criterion $SIC_j$ containing such an indication, the SIF function can be used to return only the messages associated with the setting up of the SIP dialog, that is the initial request IR and the last response received to this request and the message M_SIP triggering the invocation of the application server AS if this message is not a response to the initial request.

When the invocation of the application server AS is executed, that is, after the step 303 represented in FIG. 10a, if the SIP message denoted M"_SIP returned by the latter, this operation being denoted in the step 304

Transmission AS→SIF→M"_SIP.

The step 304 is followed by a test 305a on similarity of name of the messages M"_SIP and M_SIP. On a negative response to the test 305a, a return to the step 300 is executed. The message M"_SIP belongs to the dialog "b" correlated with the dialog "m" if this message is intended for the user agent A or with the dialog "n" if this message is intended for the user agent B, the message M"_SIP being submitted to all of the procedure. Otherwise, a test step 305 for verifying the filtering criteria by the message M"_SIP is called.

If the message M"_SIP is part of the messages to which the filtering criteria SIC can be applied, then the SIF function executes a test 305 to verify the existence of filtering criteria for the response message denoted:

M"_SIP≡SIC?

and, on a negative response for a given filtering criterion j, but in case other filtering criteria exist for j≦J, returns to the verification step 300.

On the other hand, if no other filtering criteria exist that are applicable to the response message M"_SIP, that is, on a negative response to the test 305 for j>J, then the SIF function proceeds to call the step 309 for transmission of the message M_SIP to the next node in the dialog that is correlated with it.

Depending on the behavior of the application server AS and of any other filtering criteria SIC, one or more other application servers can be invoked and inserted into the call, as will be described later in the description.

The operations performed by the SIF function depend on the incoming, respectively outgoing, dialog quality of the inciting dialog "m".

The incoming, respectively outgoing, dialog quality is discriminated by the SIF function, by a test 306 denoted B_SIP ("m")? represented in FIG. 10a.

If the inciting dialog "m" is an incoming dialog, alternative e of the test 306, then the SIF function proceeds to relay by replication the messages received from the application server AS in the following dialog "c" and intended for the origin user agent of the calling terminal A in the inciting dialog "m", the messages received from the application server AS in the following dialog "c" and intended for the terminal user agent of the called terminal B in the updated precursor dialog "nn", the messages received from the origin user agent of the calling terminal A and from the terminal user agent of the called terminal B in the inciting "n" and updated precursor "nn" dialogs in the following dialog "c".

The abovementioned various dialogs and the corresponding preceding replication operations are represented in FIG. 10b. The updated precursor dialog "nn" is the precursor dialog "n", if no other application server AS is invoked, or the outgoing dialog created following the invocation of another application server AS after the AS concerned.

If, in response to the test 306, alternative s, the inciting dialog "m" is an outgoing dialog, then the SIF function proceeds to relay by replication the messages received from the application server AS in the following dialog "c" and intended for the origin user agent of the calling terminal A in the updated precursor dialog "nn", the messages received from the application server AS in the following dialog "c" and intended for the terminal user agent of the called terminal B in the inciting dialog "m", all the messages received from the calling terminal A and from the called terminal B in the updated precursor dialog "nn" and inciting dialog "m" in the following dialog "c".

The abovementioned various dialogs and the corresponding operations of the SIF function are illustrated in FIG. 10c. The updated precursor dialog "nn" is the precursor dialog "n" if no other application server AS is invoked, or the outgoing dialog created following the invocation of another application server AS after the application server AS concerned.

The embodiment of the method that is the subject of the invention as represented in FIGS. 10a to 10c requires the application server AS to be able to deduce the context of the call from the SIP messages that are transmitted to it by the SIF function. In this case, the application server AS does not behave in B2BUA mode, but manages only a single dialog. Once the context of the call has been constructed, the application server AS then acts in proxy mode but can modify all the SIP messages as if it were in B2BUA mode. It is then the SIF function that masks such a behavior that does not conform to the SIP standard by its setting to B2BUA mode.

An exemplary implementation of the method that is the subject of the present invention, in the non-transparent mode, will now be described in association with FIG. 11.

In non-transparent mode, with respect to the service application server AS, the selective service invocation function SIF restores to the service application server AS the stored messages by delivering them by replication, and the service application server AS reconstructs a real dialog between the origin user agent and the terminal user agent.

The abovementioned exemplary implementation illustrates the case of a service being triggered on reception of the response 180 "Ringing" to an INVITE request from the call ringback tone, call waiting, or other such service. It is assumed that the logic of this service, before receiving the abovementioned response 180, simply relays the messages received then, on receiving the response 180 Ringing from the called terminal B, it sends a response 183 "Session Progress" to the calling terminal A to prepare the media connection for example, this response 183 then being followed by the response 180 Ringing, the chronological succession of the messages then being as follows:

1: INVITE from the calling terminal A to the call server S-CSCF;
2: INVITE from S-CSCF to the SIF function working in B2BUA mode;
3: INVITE from the SIF function to the server S-CSCF;
4: INVITE from S-CSCF to the called terminal B;
5: "Ringing" from the called terminal B to S-CSCF;
6: "Ringing" from S-CSCF to the SIF function;
7: INVITE from the SIF function to the application server AS;
8: "Ringing" from the SIF function to the application server AS;
9: "Session Progress" from the application server AS to the SIF function;
10: "Session Progress" from the SIF function to the server S-CSCF;
11: "Session Progress" between the server S-CSCF and the calling terminal A;
12: "Ringing" from the application server AS to the SIF function;
13: "Ringing" from the SIF function to the server S-CSCF;
14: "Ringing" from the server S-CSCF to the calling terminal A.

In this example, the SIF function invokes the server AS by sending it all the messages exchanged for the call.

Then, the SIF function simply relays the messages by using the necessary adaptations originating from the calling terminal A and from the called terminal B to the application server AS in the following dialog "c", the messages originating from the application server AS and intended for the calling terminal A to the latter, and the messages originating from the application server AS and intended for the called terminal B to the latter. It will be noted in particular that there is a single SIP dialog between the SIF function and the application server AS, the following dialog "c" described previously.

The SIP messages, depending on their chronology, belong to the following dialogs:
1, 2, 10, 11, 13, 14 dialog "m";
3, 4, 5, 6 dialog "n";
7, 8, 9, 12 dialog "c".

A more detailed description of a process of disengaging the invoked application server AS, prior to the end of the call to the terminal user agent by the origin user agent, that is, by the terminals A and B described previously, will now be given in association with FIG. 12a and the subsequent figures.

With reference to FIG. 12a, the application server AS that wants to request disengagement from the call proceeds to transmit, in a step 400, a message containing a call disengagement indication, message M_DIS(AS) to the selective service invocation function SIF.

On reception of this message and of this disengagement indication, following the step 400, the SIF function then proceeds in a step 401 to terminate the dialogs set up with the application server AS. The step 401 can then be followed by a step 402 to re-establish the correlation between the dialogs existing between the origin user agent of the terminal A and the selective service invocation function SIF, and between the selective service function and the terminal user agent of the called terminal B for this call, to re-establish the correlation that existed before the invocation of the application server AS.

FIGS. 12b and 12c represent the dialogs involved in implementing the procedure for disengaging the application server AS because the selective service invocation function SIF is working in B2BUA mode.

In these conditions, it is possible to have the application server AS withdraw, after its invocation, from the call without in any way terminating this call.

The call disengagement message is sent in one or both SIP dialogs established with the SIF function, that is, the dialogs "a" and/or "b" in FIG. 12b. On reception of this information, the SIF function terminates the dialog or dialogs set up with the application server AS and then re-establishes the correlation in the step 402 between the dialogs "m" and the dialogs "n". Only one of the dialogs such as the dialog b can be used as represented in FIG. 12c. The existence of one or two dialogs depends on the operating mode of the application server AS: B2BUA, Proxy or non-transparent mode.

As a nonlimiting example, the use of the BYE message of the SIP protocol can be used, this message containing a parameter indicating that the latter is intended to disengage the application server AS from the call and not terminate the latter.

The disengagement parameter can be contained in a new header to be defined or in an existing new header such as Call-Info for example. The BYE message is sent in each dialog set up with the SIF function for the call concerned.

In the case where the SIF function is working in non-transparent mode, there is only one following dialog "c" between the application server AS and the SIF function. The SIF function works in B2BUA mode. It is then possible to have the application server AS withdrawn from the call without terminating the latter, by specifying the information indicating the disengagement from the call and the transmission of this information by the application server AS in an SIP message transmitted in the context of the following dialog "c". The operation for correlating the dialogs "m" and "n" is executed in the same way as in FIGS. 12b and 12c.

Similarly, as an example, the BYE message containing a parameter indicating that the abovementioned message is intended to disengage the application server AS from the call can be implemented. This parameter can be contained in a specific new header or in an existing header such as the Call-Info mentioned previously.

A more detailed description of a server invoking a service application server, in accordance with the subject of the present invention, will now be given in conjunction with FIG. 13.

As represented in the abovementioned figure, in addition to the input/output units denoted I/O, a central processing unit CPU, a working memory RAM and a functional module of the S-CSCF type denoted $M_0$ and including all the functions of a conventional server S-CSCF, the call server that is the subject of the invention advantageously includes a module M1 for storing conditional service trigger filtering criteria, criteria SIC described previously in the description, that can include the state of the user agent of a called subscriber terminal, the terminal B, when the triggering is executed on an initial request IR.

The invoking call server also includes a selective service invocation function module M including at least the verification of triggering criteria applicable to a user agent according to its position: calling or called. The selective service invocation function module M receives all the initial SIP requests intended for or originating from the user agents of the subscriber terminals concerned via input/output units I/O. It makes it possible to invoke at least one service application server AS according to the state of the user agent of the subscriber terminal B. The selective service invocation function module is referenced M in FIG. 13.

Furthermore, as represented in the above-mentioned figure, the selective service invocation module M is subdivided into a first submodule M1 for processing the SIP messages that make up an initial request. The abovementioned submodule is a software submodule making it possible to execute the method that is the subject of the present invention and, in particular, the SIF function as described previously in the description in association with FIG. 5a and the subsequent figures.

It advantageously includes a second submodule, submodule M2, for processing the SIP messages belonging to an existing dialog in a transparent operating mode. The submodule M2 is also a software module making it possible to execute the processing of the messages M_SIP belonging to a dialog, as described previously in the description in association with FIG. 5b and the subsequent figures.

It finally, advantageously, includes a third submodule M3 for processing SIP messages belonging to an existing dialog in a non-transparent operating mode, as described previously in the description in association with FIG. 10a. Thanks to the introduction of the submodule M3, the number of messages exchanged between the selective service invocation function module M and each application server is thus reduced, as mentioned in the description. It will be understood in particular that the modules M2 and M3 can be switched by software in order to handle the processing of the SIP messages, either transparently or non-transparently, depending on the choice of the SIP network manager.

Finally, the invention also covers a computer program product stored on a storage medium for execution by a computer or by a dedicated invocation call server as described in association with the abovementioned FIG. 13, particularly noteworthy in that this computer program product includes instructions making it possible to execute the method according to FIGS. 5a, 5b, 10a et seq., previously described in the description.

The invention claimed is:

1. A method of invoking at least one service application server, in a communication between an origin user agent and a terminal user agent, comprising:
    opening two separate dialogs, the dialogs comprising messages, between a selective service invocation function and, respectively, the origin user agent and the terminal user agent, the selective service invocation function replacing the terminal user agent in its dialog with the origin user agent and replacing the origin user agent in its dialog with the terminal user agent;
    at least partly storing the messages originating from the user agents in the two separate dialogs;
    checking at least one conditional service triggering criterion on each of the two separate dialogs; and
    if the triggering criterion is satisfied, creating at least one third dialog comprising messages between the selective service invocation function and the service application server, correlating the at least one third dialog with the two separate dialogs and at least partly restoring the at least partly stored messages to the service application server prior to triggering an invocation of the service application server, using the two separate dialogs and the at least one third dialog, correlated together.

2. The method as claimed in claim 1, wherein the at least one conditional service triggering criterion includes:
    reception of a response to an initial request;

expiry of a time delay, measuring the duration between the reception of a provisional response and the non-reception of a final response;

reception of a request received in a confirmed dialog;

reception of a request received in an unconfirmed dialog; and the state of the terminal user agent.

3. The method as claimed in claim 2, wherein the two separate dialogs are SIP dialogs.

4. The method as claimed in claim 1, in which, to open the two separate dialogs with, respectively, the origin user agent and the terminal user agent, the selective service invocation function works in B2BUA mode.

5. The method as claimed in claim 1, wherein, if the origin user agent sends the terminal user agent an initial request to initiate an SIP transaction, the selective service invocation function detects that it is an initial request for a simple SIP transaction and then works in a conventional application server invocation mode, without opening two separate dialogs with the origin user agent and the terminal user agent respectively.

6. The method as claimed in claim 1, wherein triggering the invocation of the service application server comprises executing the selective service invocation function in an SIP call server, comprising a proxy S-CSCF.

7. The method as claimed in claim 1, wherein triggering the invocation of the service application server comprises executing the selective service invocation function in a specific application server.

8. The method as claimed in claim 1, in which, in a transparent mode with respect to the service application server, the selective service invocation function restores to the service application server the at least partly stored messages by simulating a real dialog between the origin user agent and the terminal user agent.

9. The method as claimed claim 1, in which, in a non-transparent mode with respect to the service application server, the selective service invocation function restores to the service application server the at least partly stored messages by delivering them by replication and the service application server reconstructs a real dialog with the origin user agent and the terminal user agent.

10. The method as claimed in claim 1, wherein, to disengage the invoked service application server before an end of the communication between the origin user agent and the terminal user agent, the method further comprises:

transmission by the service application server to the selective service invocation function of call disengagement information;

on receipt of the disengagement information, termination by the selective service invocation function of the dialog or dialogs set up with the application server; and recreation of the dialog between the origin user agent and the selective service invocation function, and the dialog between the selective service invocation function and the terminal user agent.

11. A selective invocation server for at least one service application server, comprising:

means for, in a communication between an origin user agent and a terminal user agent, opening two separate dialogs, the dialogs comprising messages, between a selective service invocation function and, respectively, the origin user agent and the terminal user agent, the selective service invocation function replacing the terminal user agent in its dialog with the origin user agent and replacing the origin user agent in its dialog with the terminal user agent;

means for at least partly storing the messages originating from the user agents in the two separate dialogs; and means for checking at least one conditional service triggering criterion on each of the two separate dialogs; and means for creating at least one third dialog comprising messages between the selective service invocation function and the service application server, correlating the at least one third dialog with the two separate dialogs and at least partly restoring the at least partly stored messages to the service application server prior to triggering an invocation of the service application server, using the two separate dialogs and the at least one third dialog, correlated together, if the triggering criterion is satisfied.

12. The selective invocation server as claimed in claim 11, in which the means for at least partly restoring the at least partially stored messages are arranged to simulate a real dialog between the origin user agent and the terminal user agent, the selective invocation server thus working in transparent mode with respect to the service application server.

13. The selective invocation server as claimed in claim 11, in which the means for at least partly restoring the at least partially stored messages are arranged to deliver the at least partially stored messages by replication, the selective invocation server thus working in non-transparent mode with respect to the service application server.

14. A service application server comprising means for receiving messages stored by the selective invocation server as claimed in claim 13, and for reconstructing a real dialog between the origin user agent and the terminal user agent.

15. A computer program for a selective invocation server, comprising software instructions stored in a non-transitory computer readable storage medium, which, when executed by the selective invocation server, lead the selective invocation server to execute the steps of the method as claimed in claim 1.

16. A computer program for a service application server, comprising software instructions stored in a non-transitory computer readable storage medium, which, when executed by the service application server, lead the service application server to receive messages stored by the selective invocation server as claimed in claim 13, and to reconstruct a real dialog between the origin user agent and the terminal user agent via a call server.

* * * * *